(12) United States Patent
Orozco et al.

(10) Patent No.: US 9,487,154 B2
(45) Date of Patent: Nov. 8, 2016

(54) MODULAR MOUNTING SYSTEM

(71) Applicants: Xander Orozco, Grandview, MO (US); Louis Orozco, Grandview, MO (US)

(72) Inventors: Xander Orozco, Grandview, MO (US); Louis Orozco, Grandview, MO (US)

( * ) Notice: Subject to any disclaimer, the term of this patent is extended or adjusted under 35 U.S.C. 154(b) by 369 days.

(21) Appl. No.: 14/092,106

(22) Filed: Nov. 27, 2013

(65) Prior Publication Data
US 2014/0130721 A1    May 15, 2014

Related U.S. Application Data

(63) Continuation-in-part of application No. 13/366,910, filed on Feb. 6, 2012, now abandoned.

(51) Int. Cl.
*B60R 11/00* (2006.01)
*A47B 13/08* (2006.01)

(52) U.S. Cl.
CPC ............. *B60R 11/00* (2013.01); *A47B 13/088* (2013.01); *B60R 2011/0029* (2013.01)

(58) Field of Classification Search
CPC ........... B60R 11/00; B60R 2011/0029; A47B 13/088; B60N 2/01583; B60N 2/2821; B60N 2/2863
USPC .......... 224/42.32, 42.4, 547; 292/11, 14, 18, 292/24, 25, 26, 27, 29, 3; 248/220.21, 248/222.51, 223.31, 224.7, 224.8, 225.21
See application file for complete search history.

(56) References Cited

U.S. PATENT DOCUMENTS

| | | | | |
|---|---|---|---|---|
| 4,325,531 A | * | 4/1982 | Omholt | B62J 9/00 224/42.4 |
| 4,836,707 A | * | 6/1989 | Myers | B25B 5/08 24/635 |

* cited by examiner

*Primary Examiner* — Corey Skurdal
(74) *Attorney, Agent, or Firm* — Hovey Williams LLP

(57) ABSTRACT

A modular mounting system is provided to store equipment in a variety of configurations. The system includes a mounting base configured to be rigidly mounted to a surface and a base member removably attached to the mounting base. The system further includes a coupling mechanism that removably holds the base member relative to the mounting base.

15 Claims, 30 Drawing Sheets

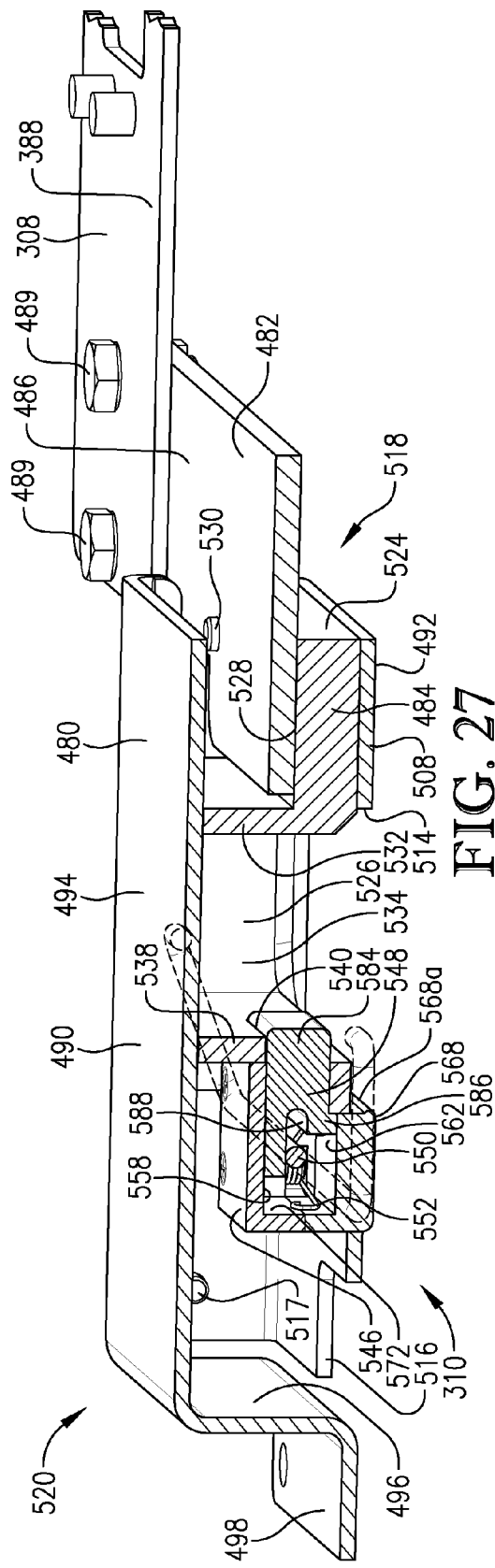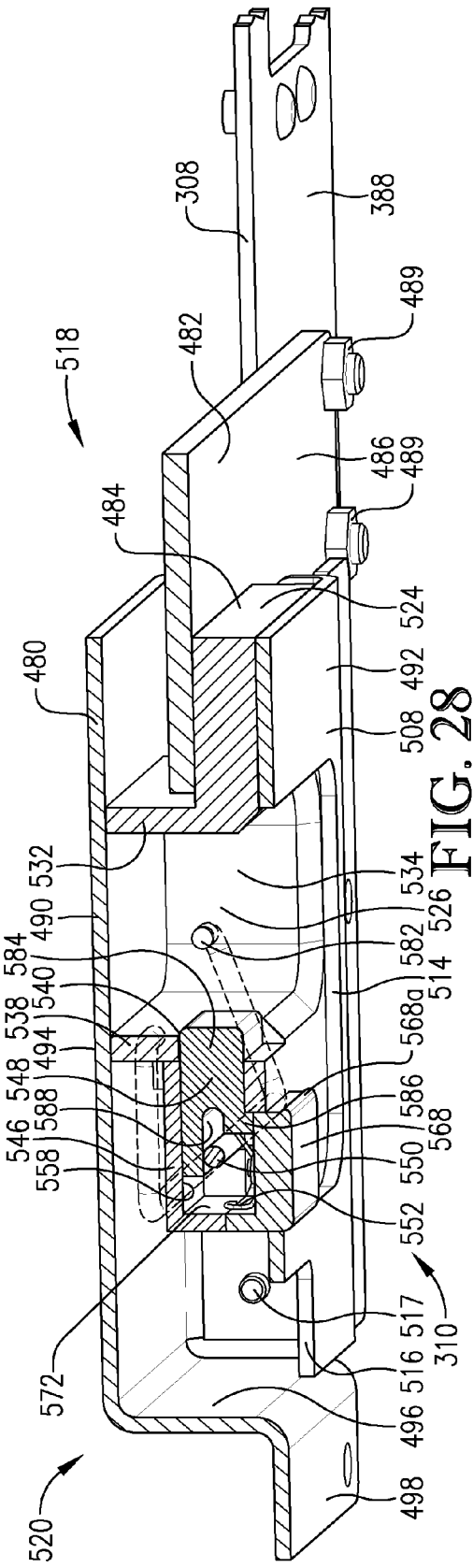

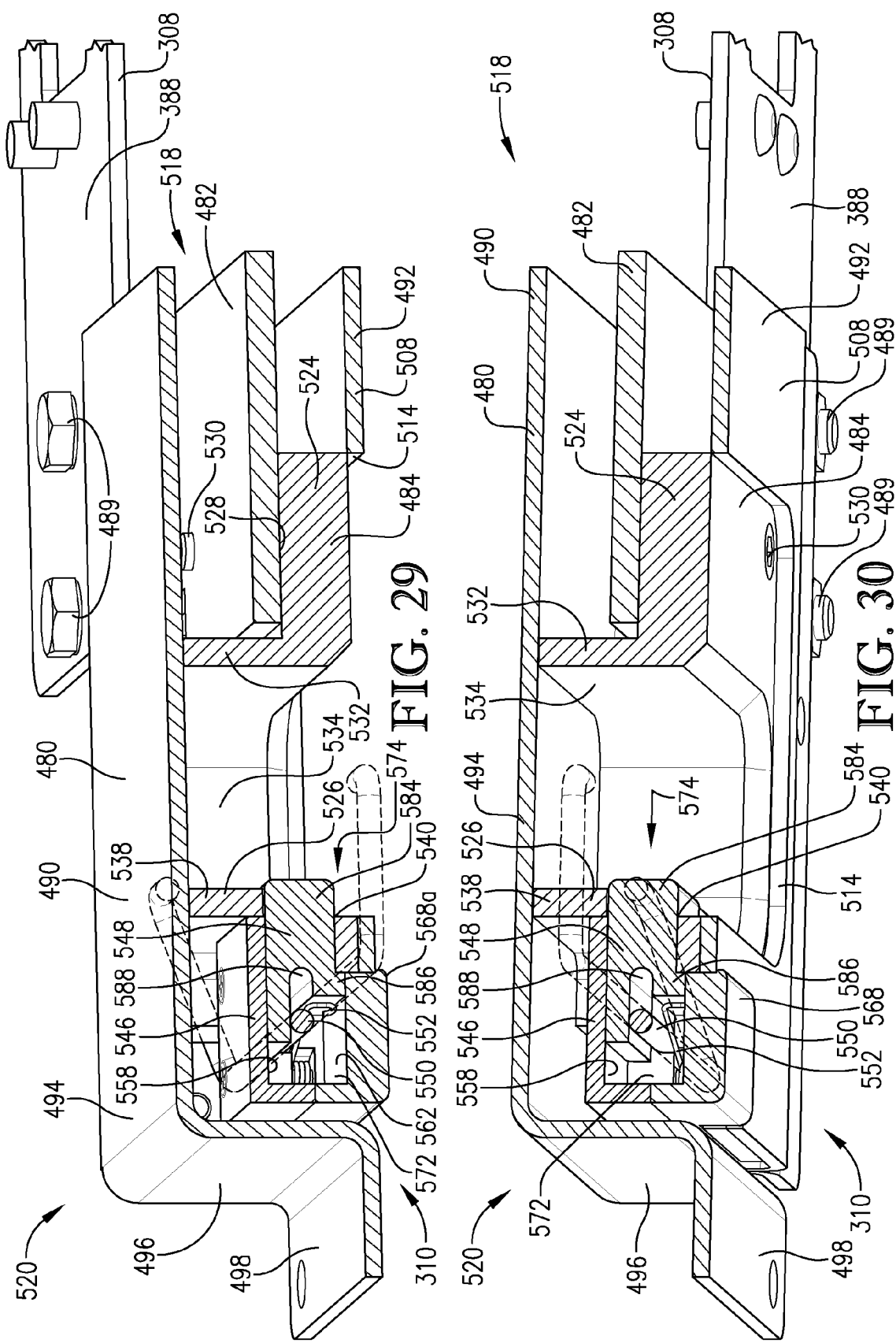

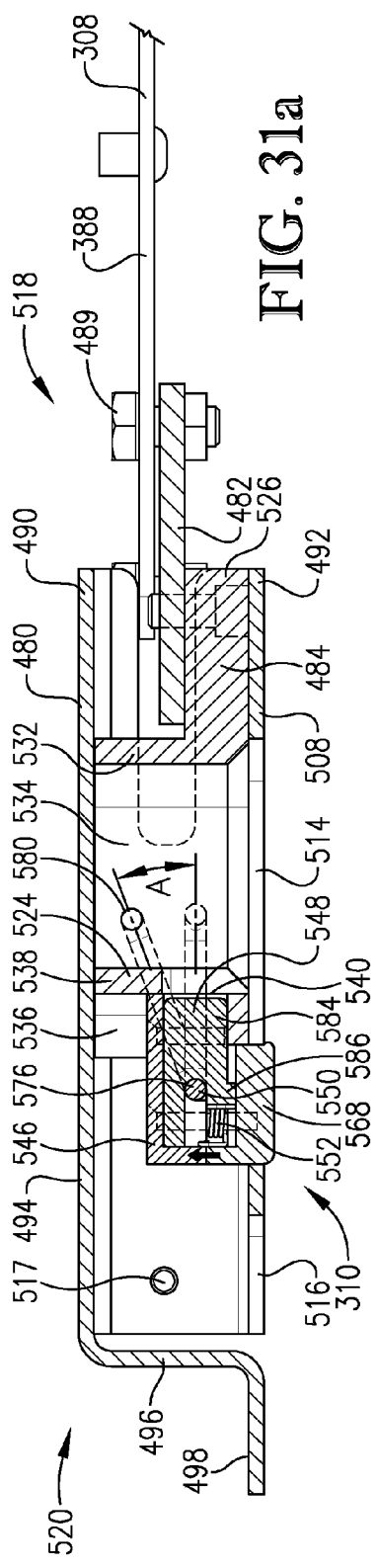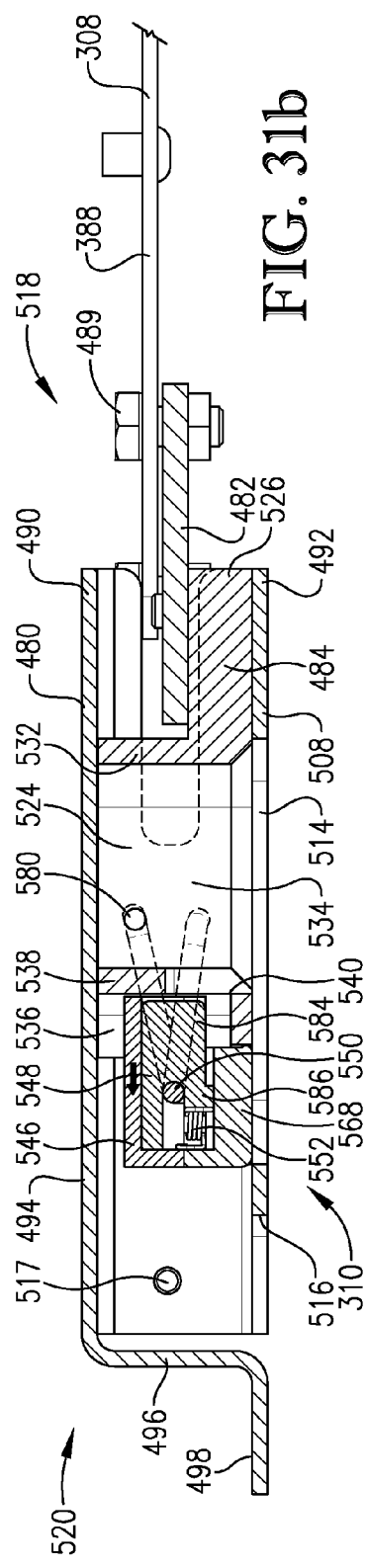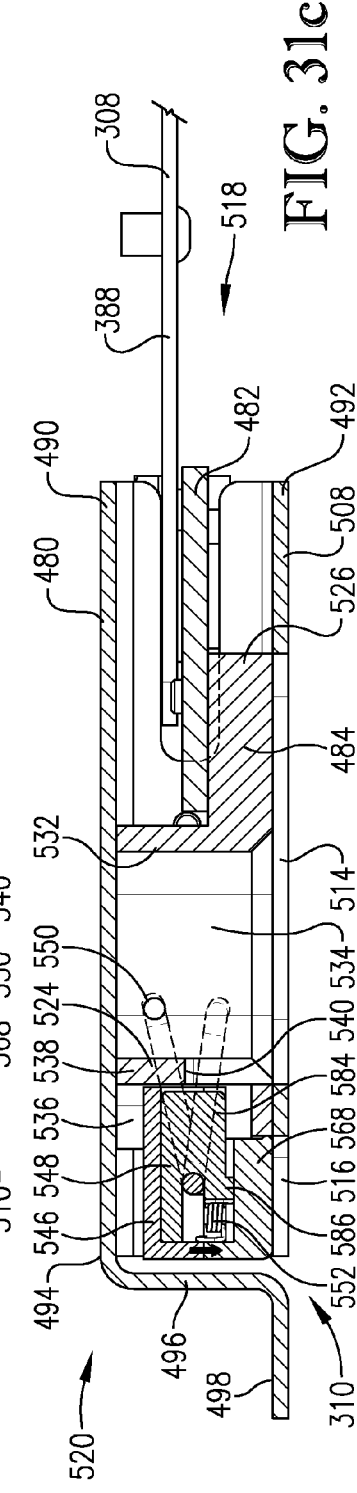

MODULAR MOUNTING SYSTEM

RELATED APPLICATION

This is a continuation-in-part of U.S. application Ser. No. 13/366,910, filed Feb. 6, 2012, entitled MODULAR MOUNTING SYSTEM FOR VEHICLES, which was filed contemporaneously with U.S. Provisional Application No. 61/595,345, filed Feb. 6, 2012, entitled MODULAR RETROFIT FOR ARMORED VEHICLES WITH CONSOLE AND STORAGE SYSTEMS, each of which is hereby incorporated in its entirety by reference herein.

BACKGROUND

1. Field

The present invention relates generally to modular storage of equipment. More particularly, embodiments of the present invention concern a modular system that provides work and/or storage space in a variety of selectable configurations.

2. Discussion of Prior Art

Equipment is commonly transported in vehicles, and other mobile containers, having a fixed storage space with little to no functionality. Although some vehicles may be equipped with various components, for example, shelving, such components are generally fit for only a particular purpose, which makes it difficult for such vehicles to accommodate any other purposes after the vehicles has been equipped with such components.

Accordingly, there is a need for a system for storing equipment that does not suffer from the limitations of conventional systems, is versatile to permit use in a wide variety of applications, and has a simple design that is easy to use.

SUMMARY

The following brief summary is provided to indicate the nature of the subject matter disclosed herein. While certain aspects of the present invention are described below, the summary is not intended to limit the scope of the present invention.

Embodiments of the present invention provide a modular mounting system that does not suffer from the problems and limitations of the prior art storage equipment set forth above.

A first aspect of the present invention concerns a modular mounting system that permits a user to removably mount equipment. The system broadly includes a mounting base, a removable member, and a latch device. The mounting base presents an exposed receiving surface that is generally accessible by the user. The removable member is removably attached relative to the receiving surface in a supporting position, with the removable member being shiftable relative to the receiving surface into and out of the supporting position. The latch device is shiftably mounted to the mounting base to shift into latching engagement with the removable member when the removable member is in the supporting position, with the latch device restricting movement of the removable member out of the supporting position. The mounting base presents a chamber that receives the latch device. The latch device is spaced below the receiving surface so that the receiving surface substantially covers the latch device.

The foregoing and other aspects are intended to be illustrative of the present general inventive concept and are not meant in a limiting sense. Many possible embodiments of the present general inventive concept may be made and will be readily evident upon a study of the following specification and accompanying drawings comprising a part thereof. Various features and subcombinations of present general inventive concept may be employed without reference to other features and subcombinations. Other objects and advantages of this present general inventive concept will become apparent from the following description taken in connection with the accompanying drawings, wherein is set forth by way of illustration and example, an embodiment of this present general inventive concept and various features thereof.

BRIEF DESCRIPTION OF THE DRAWING FIGURES

Preferred embodiments of the invention are described in detail below with reference to the attached drawing figures, wherein.

Figure 6:
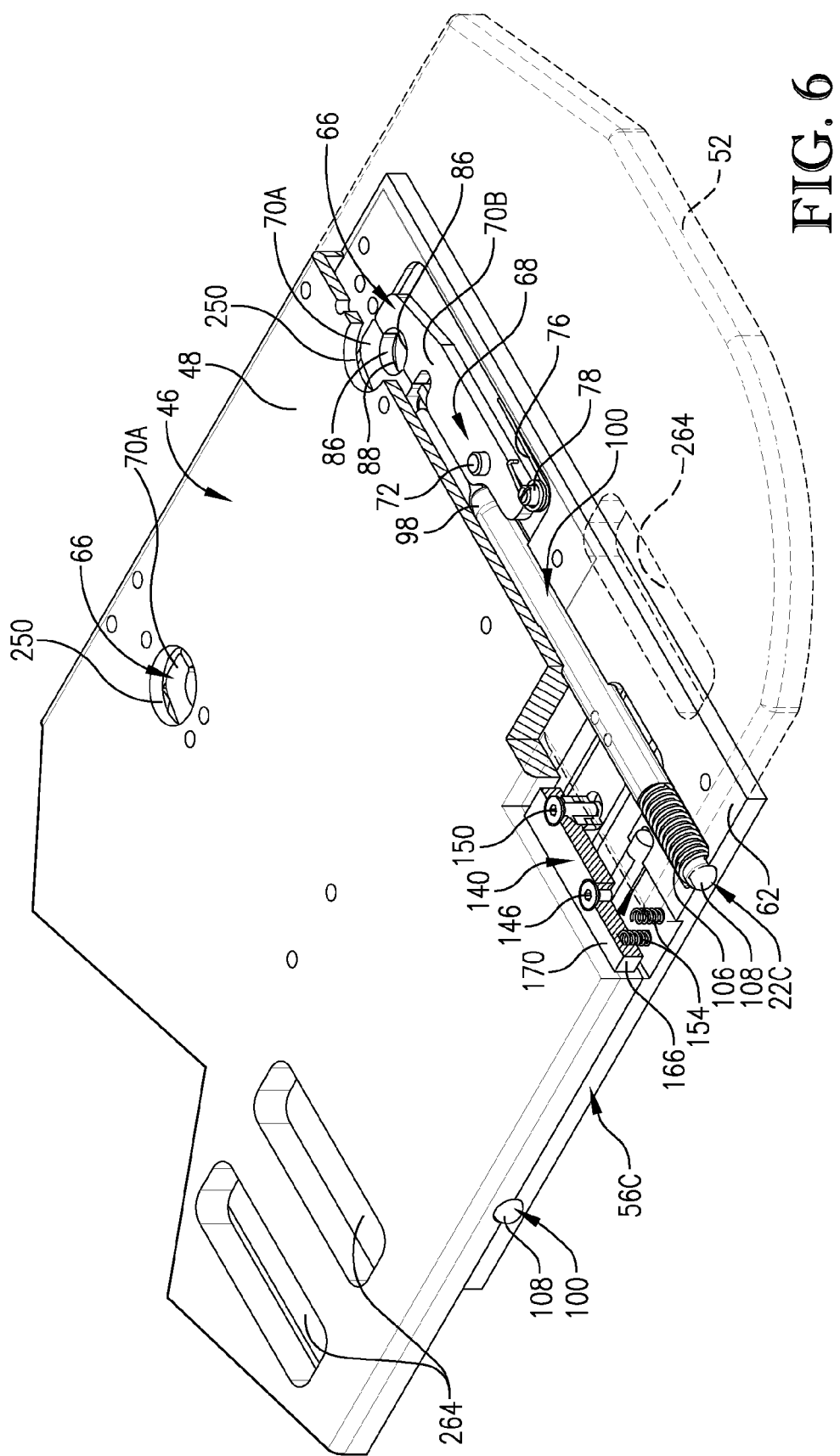
Figure 7:
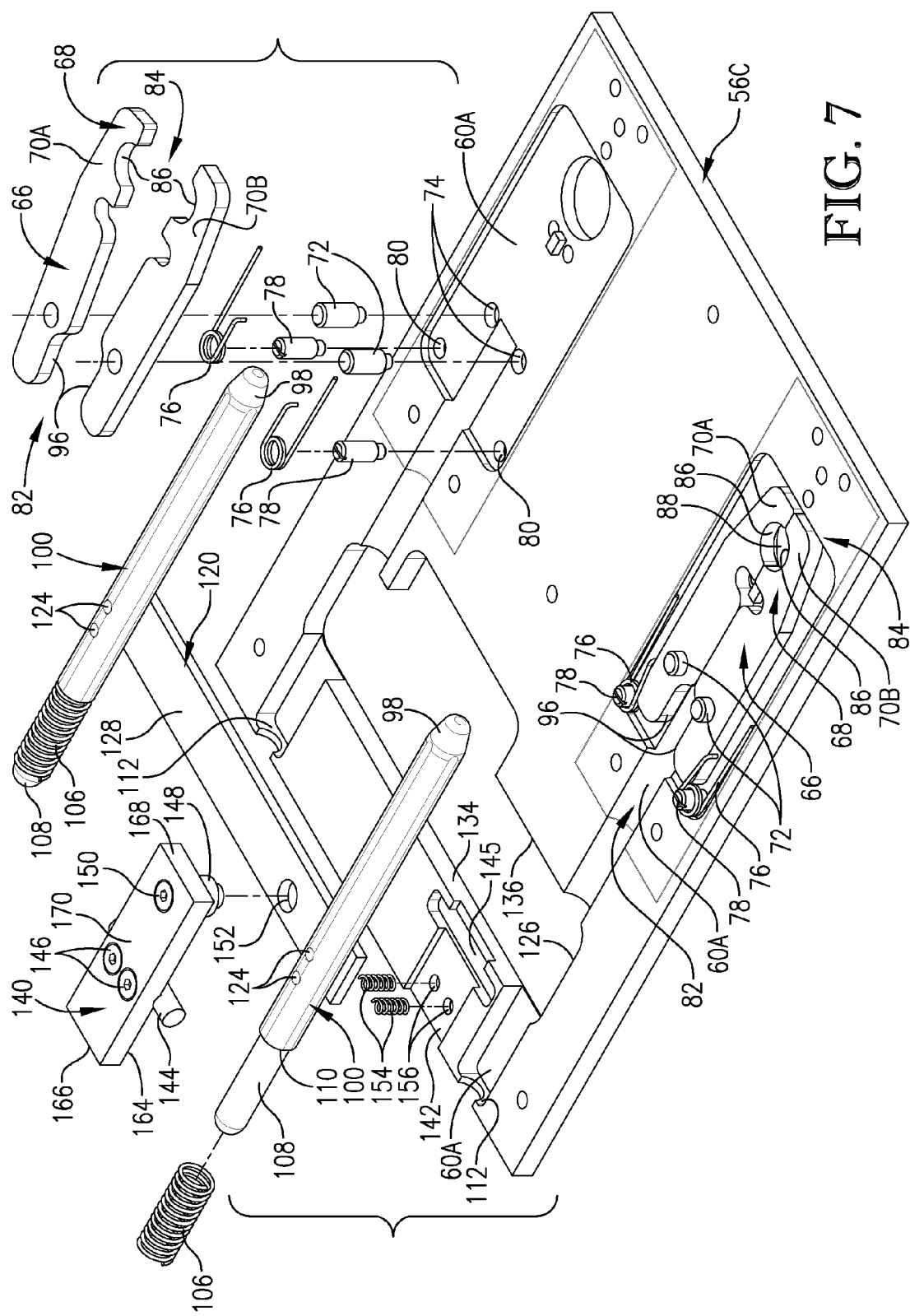
Figure 8:
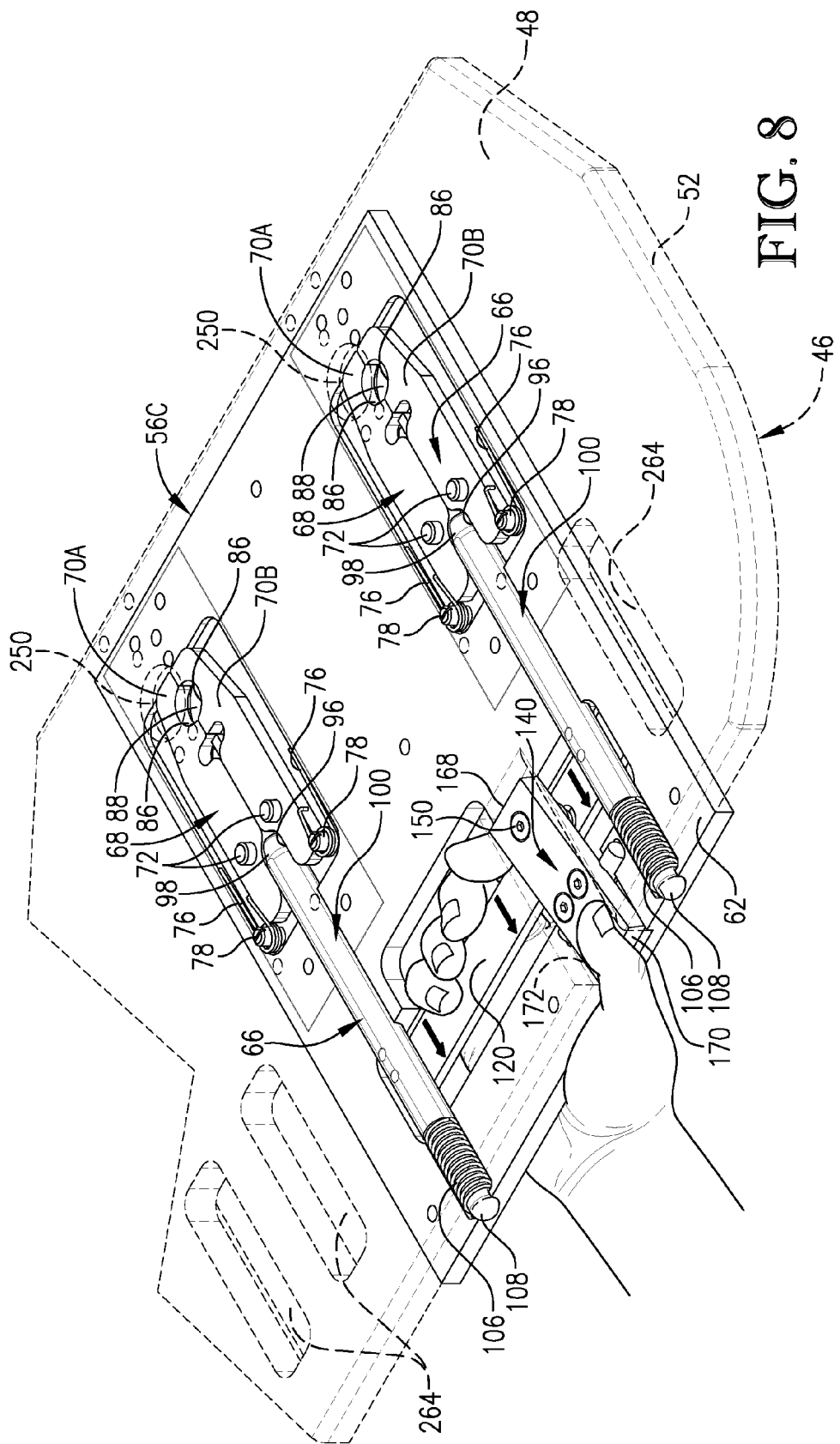
Figure 9:
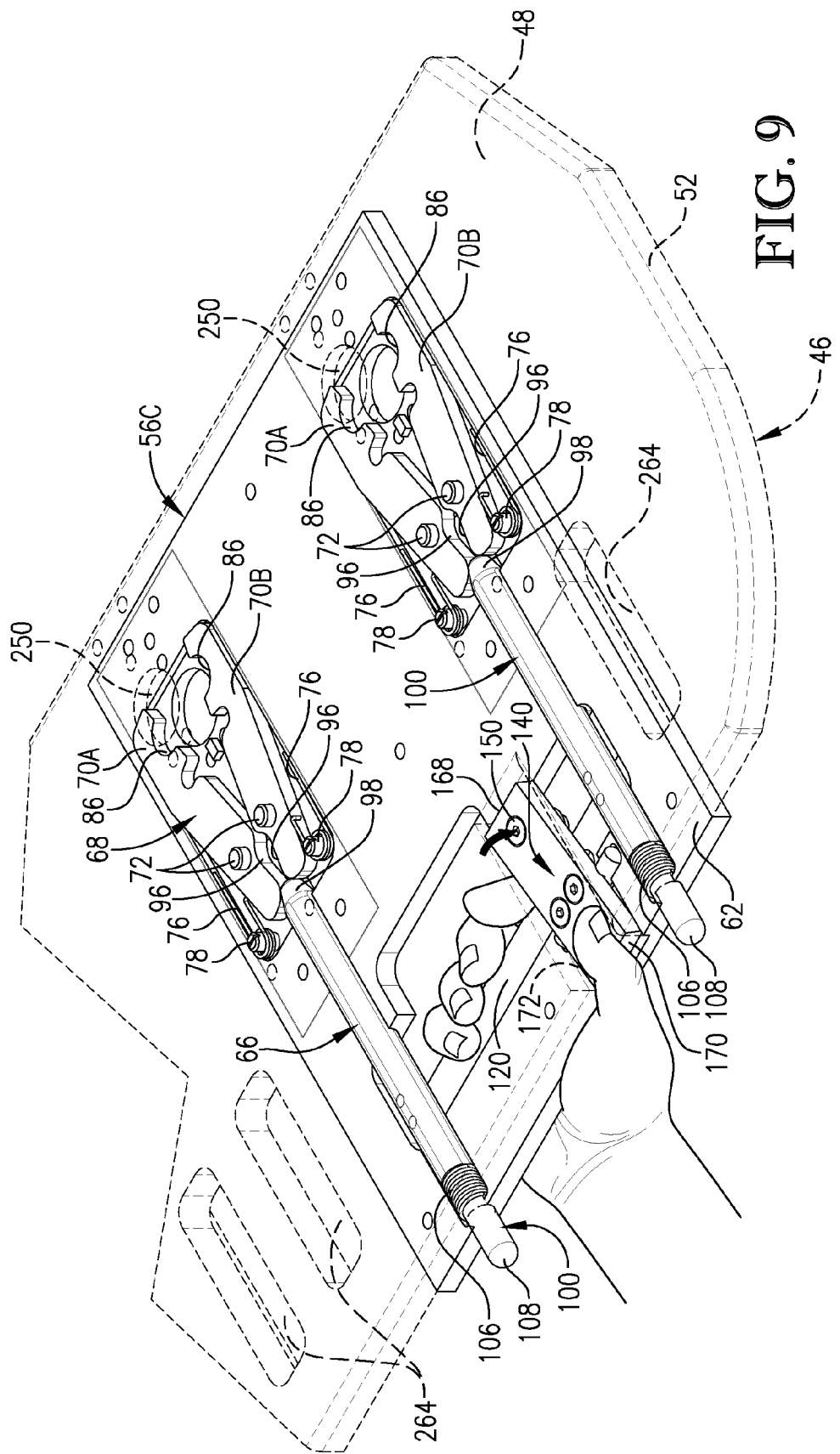
Figure 10:
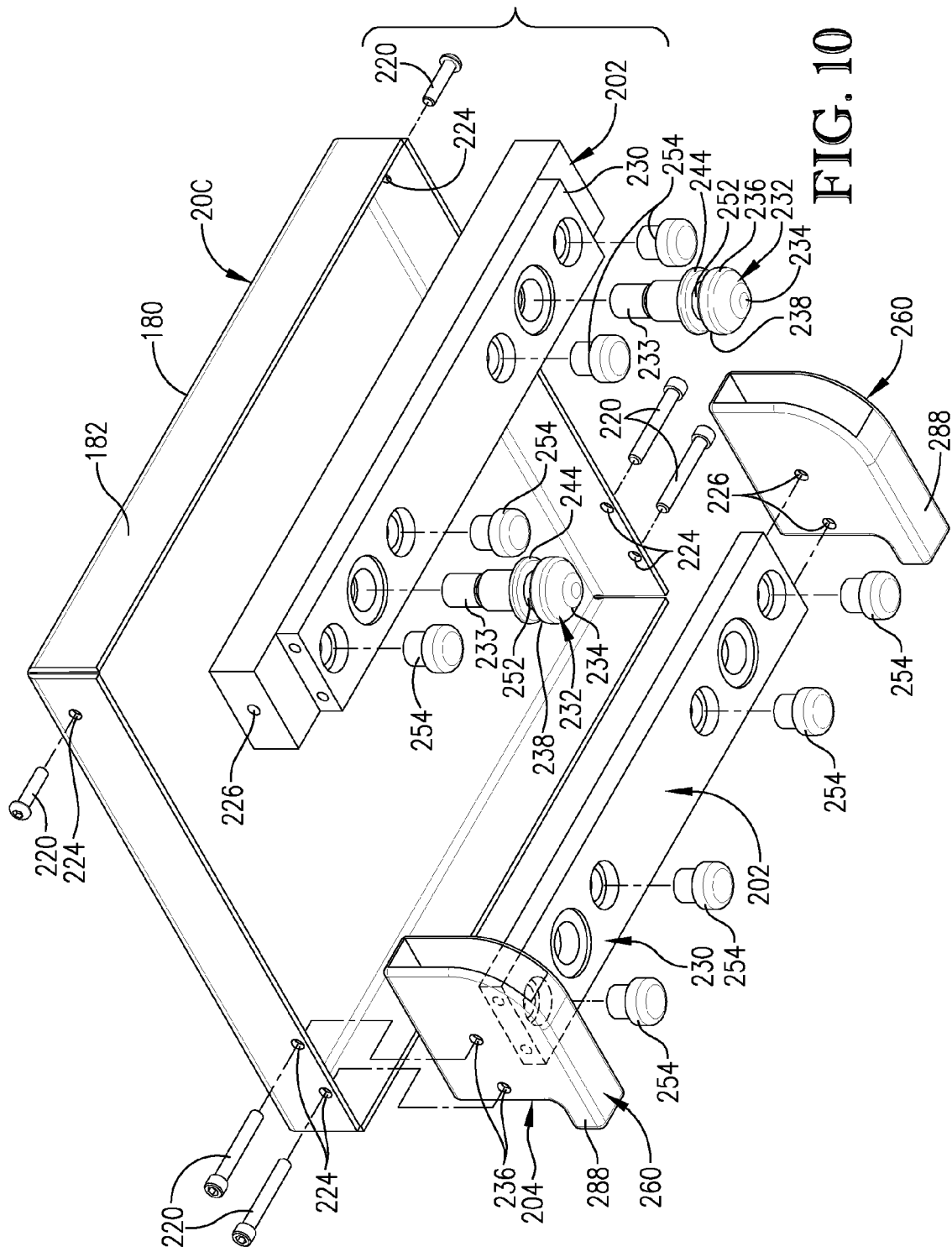
Figure 11:
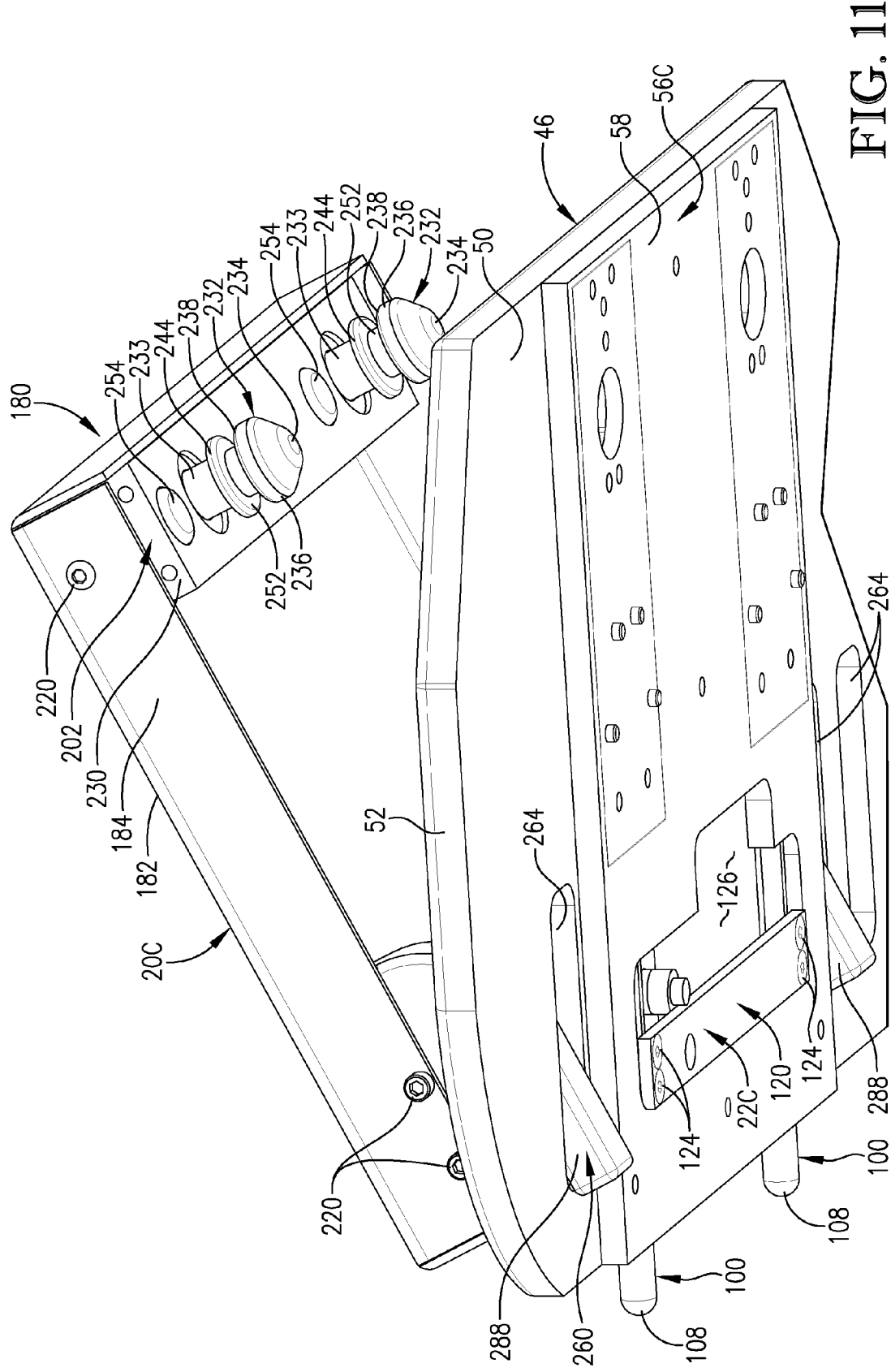
Figure 12:
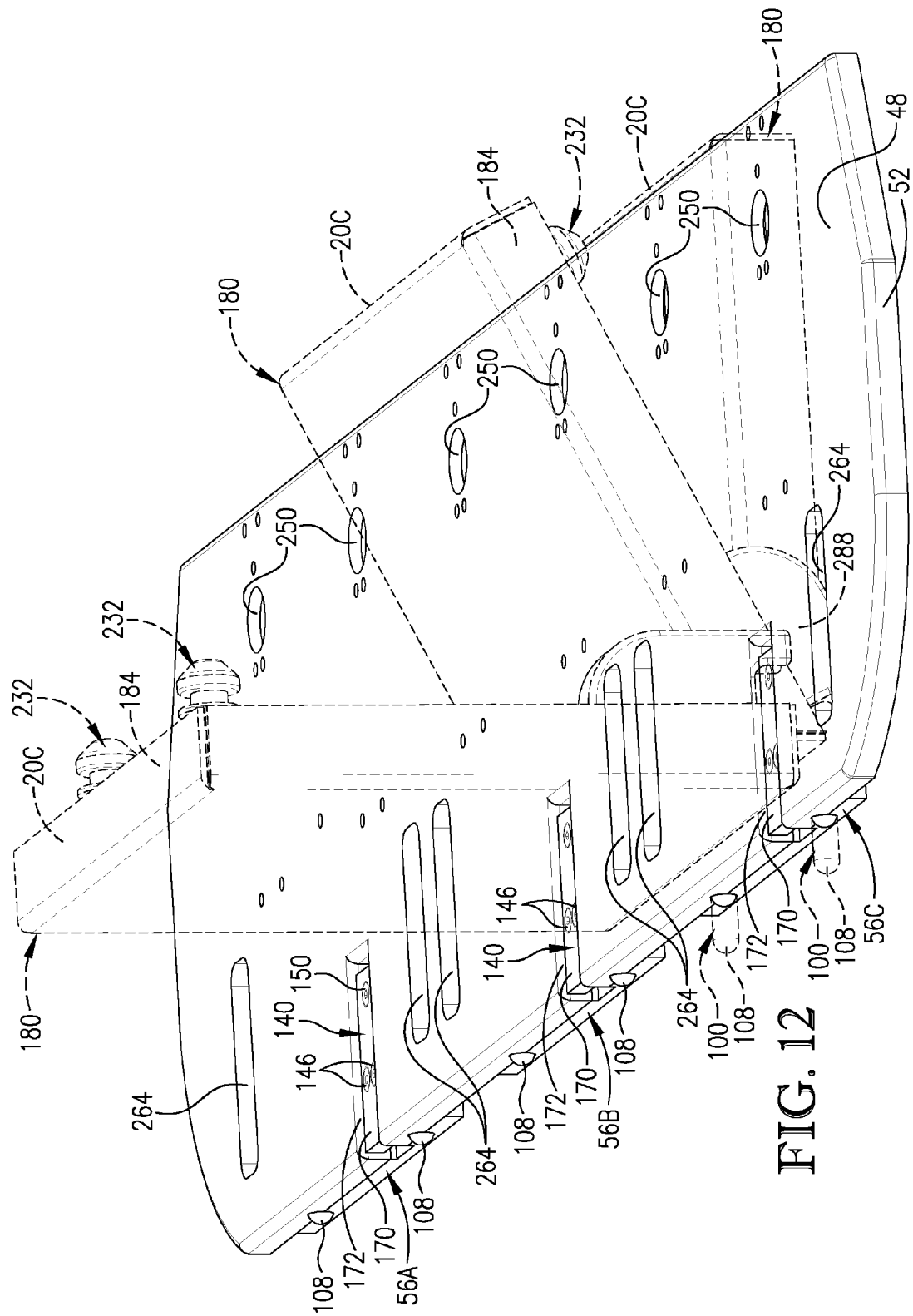
Figure 13:
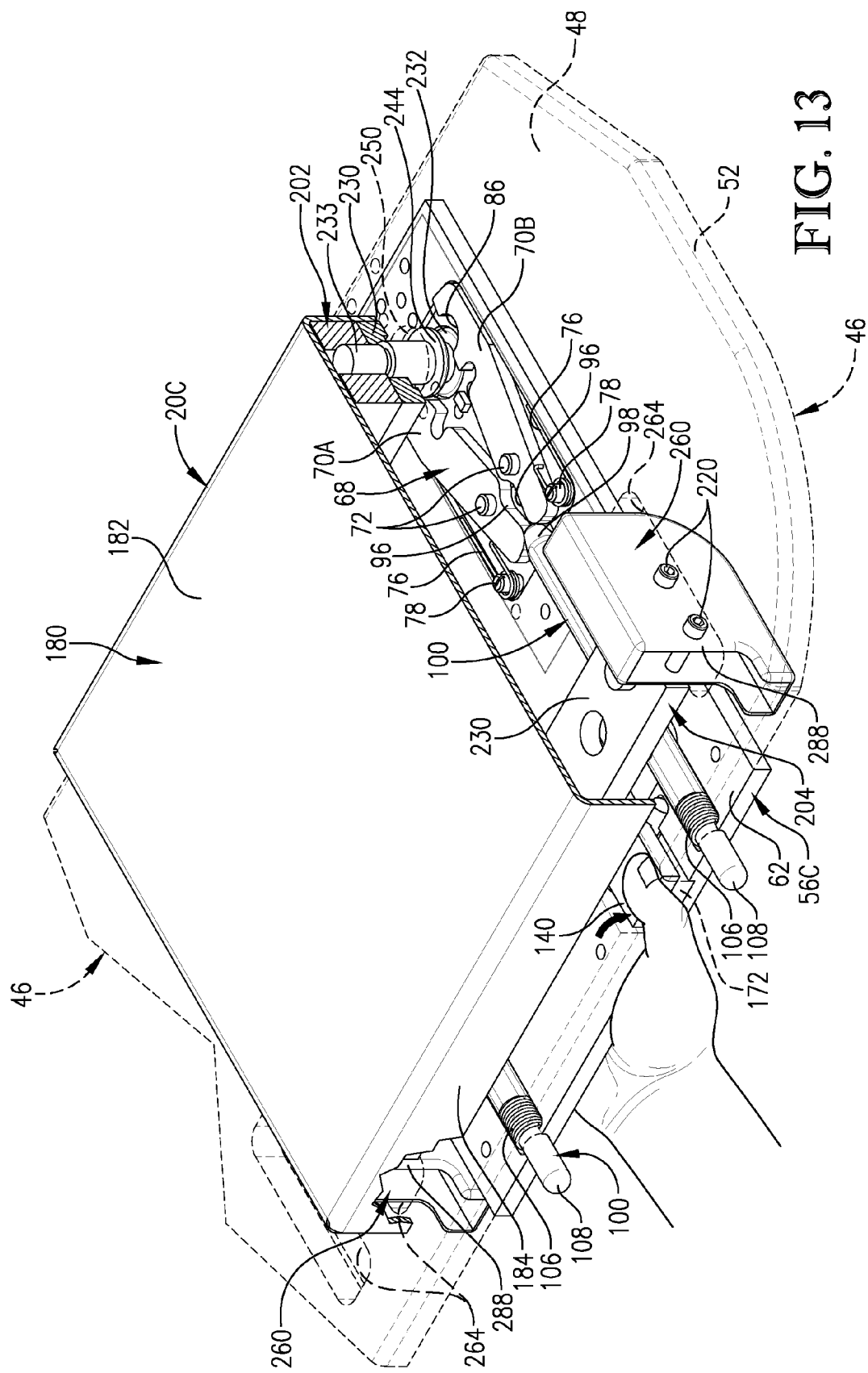
Figure 14:
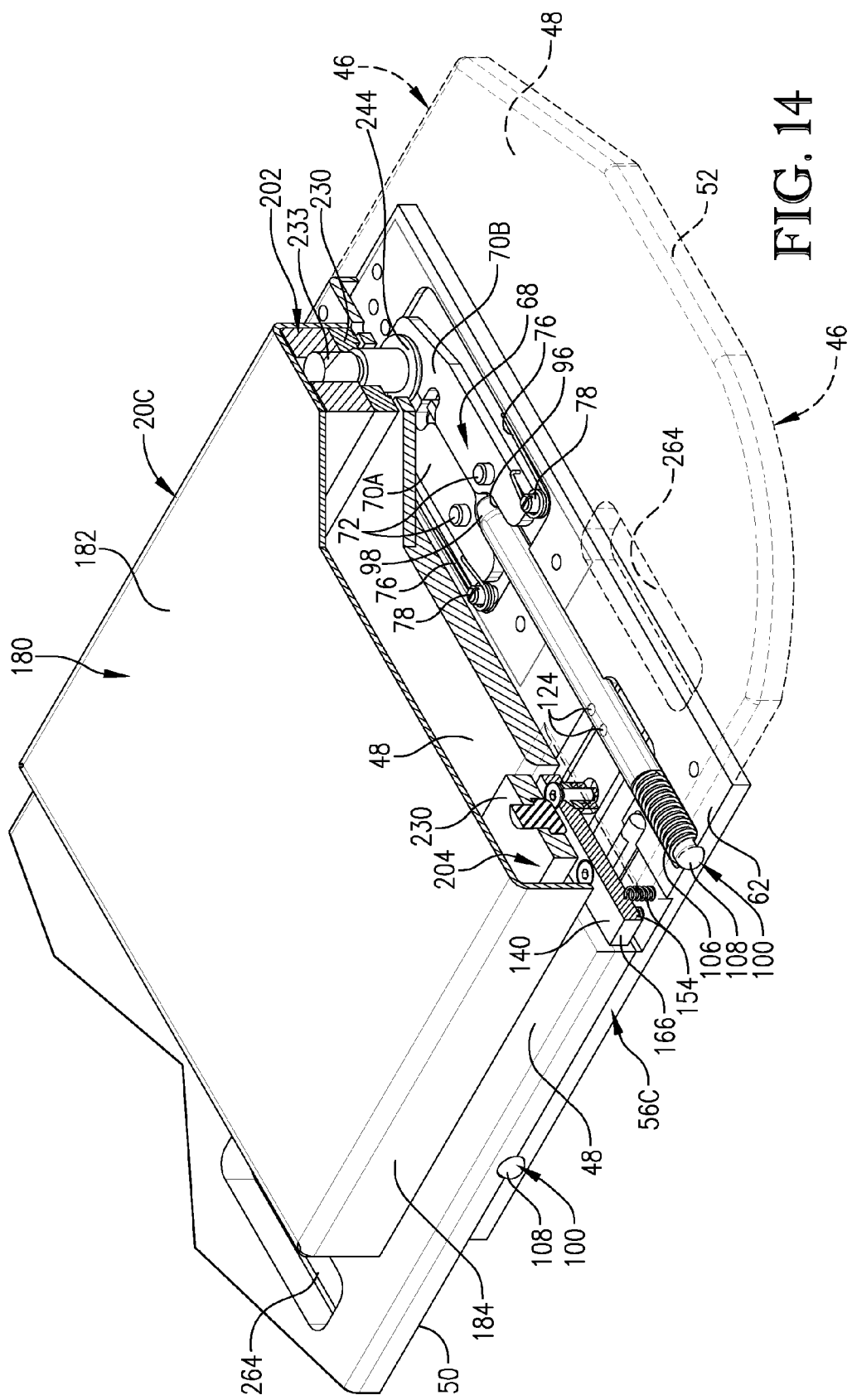
Figure 15:
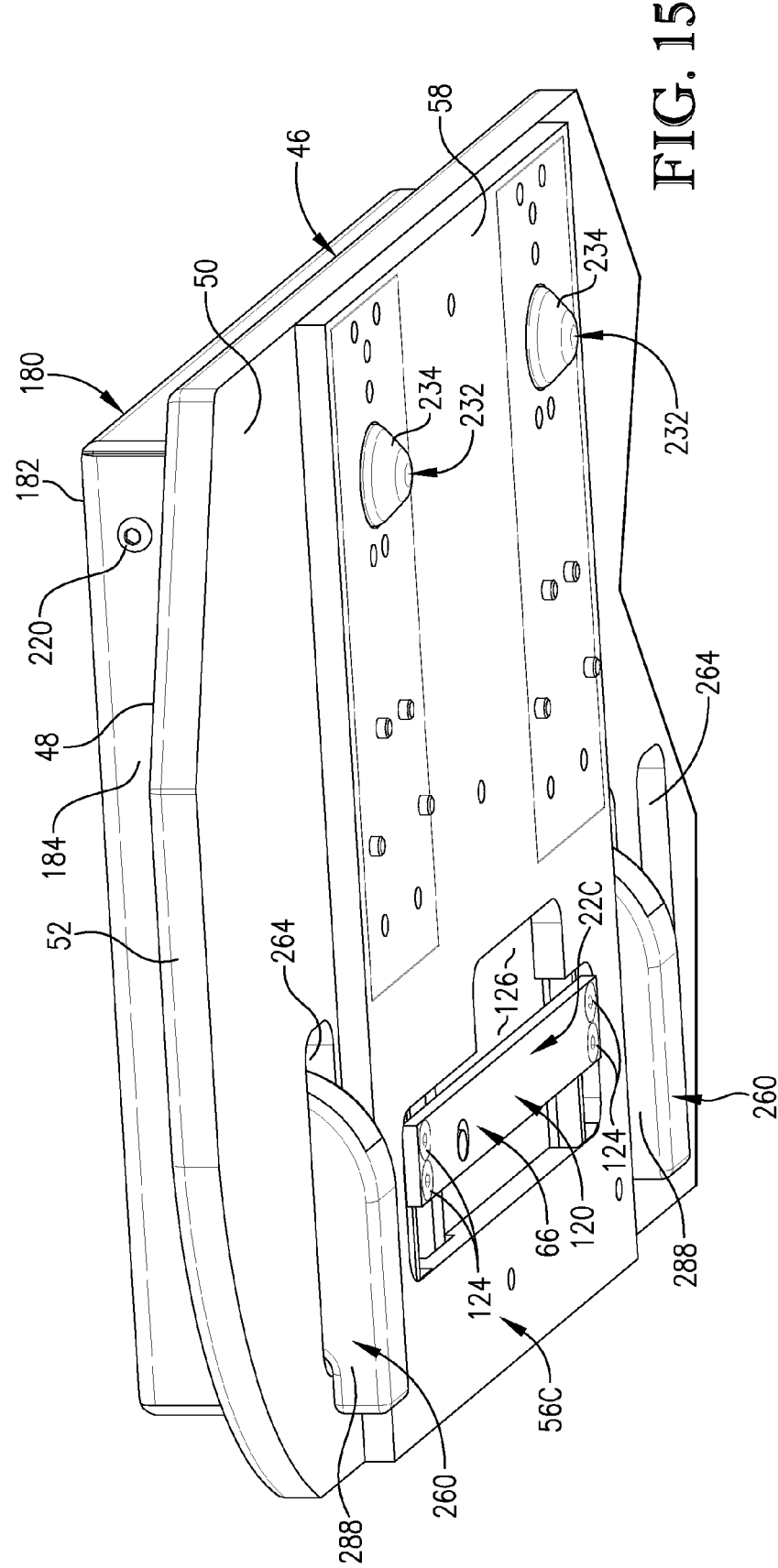
Figure 16:
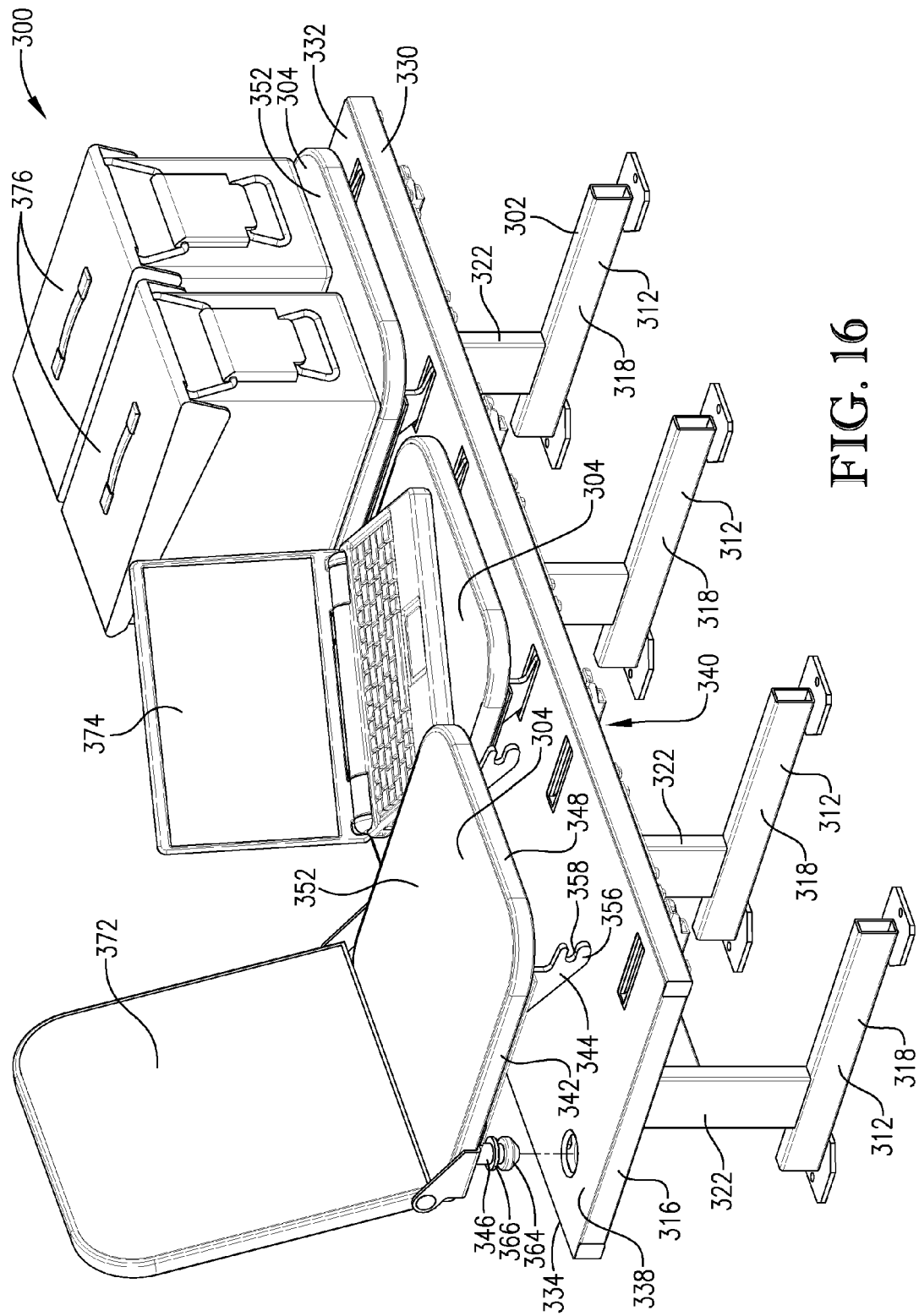
Figure 17:
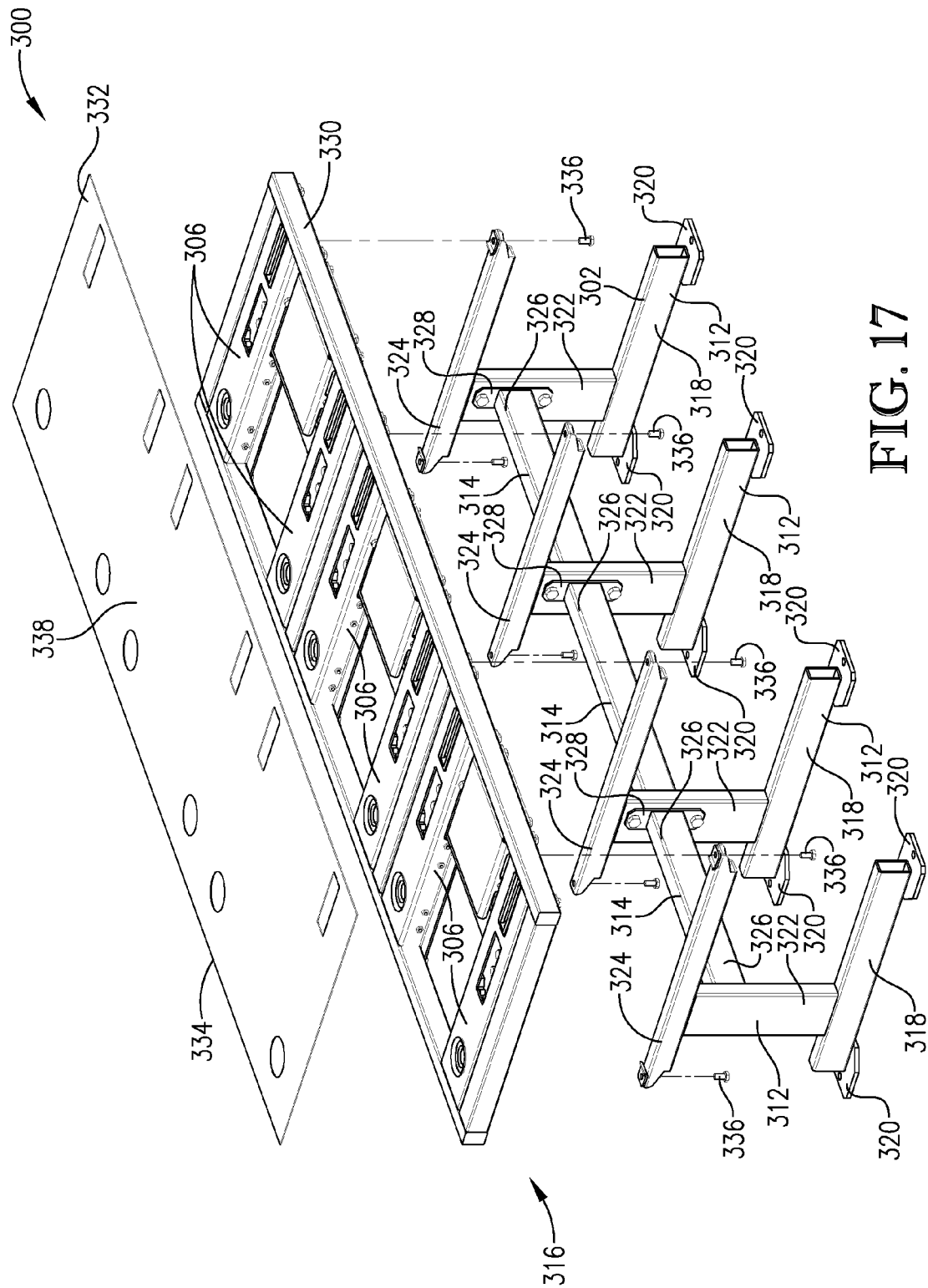
Figure 18:
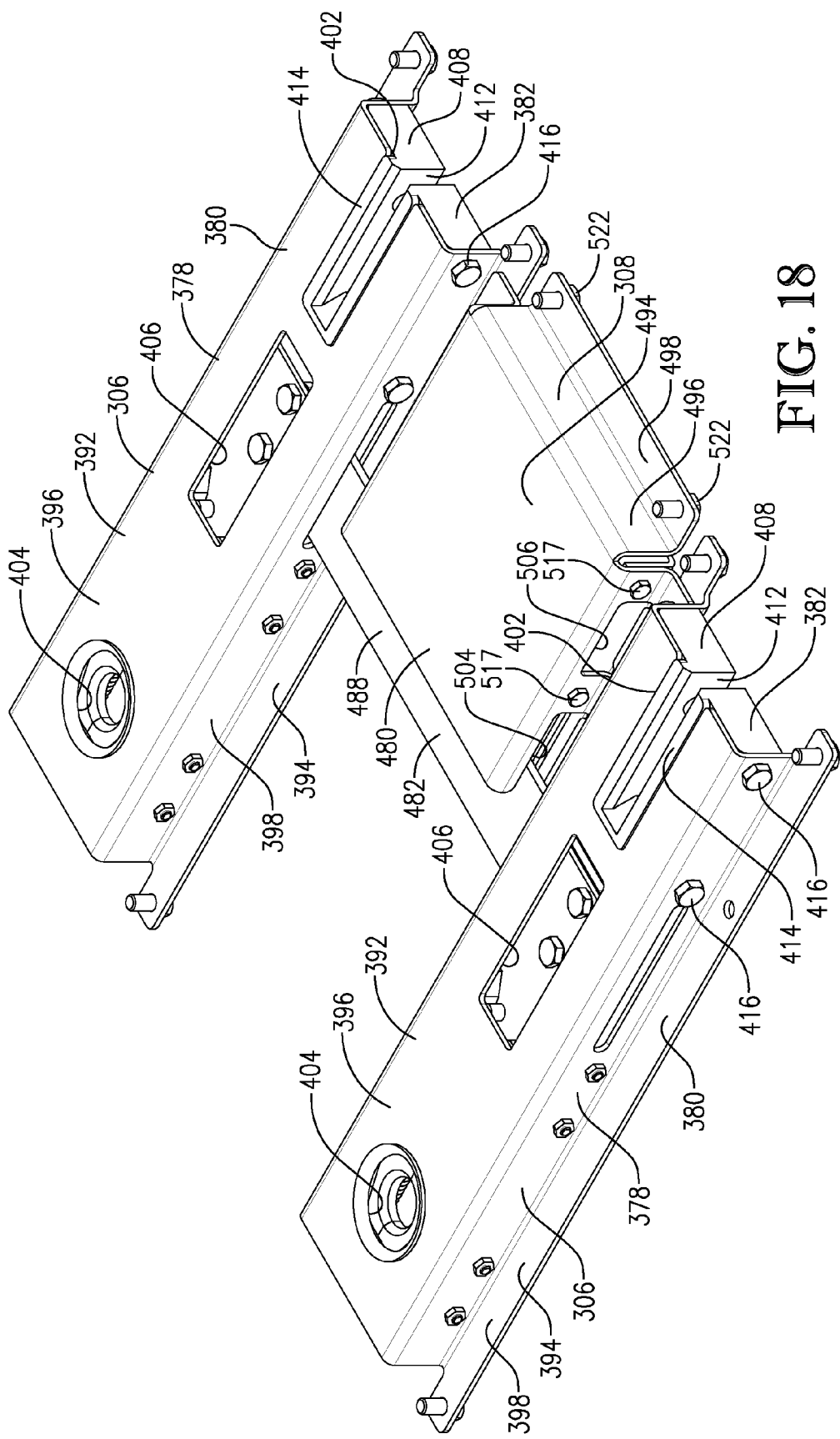
Figure 19:
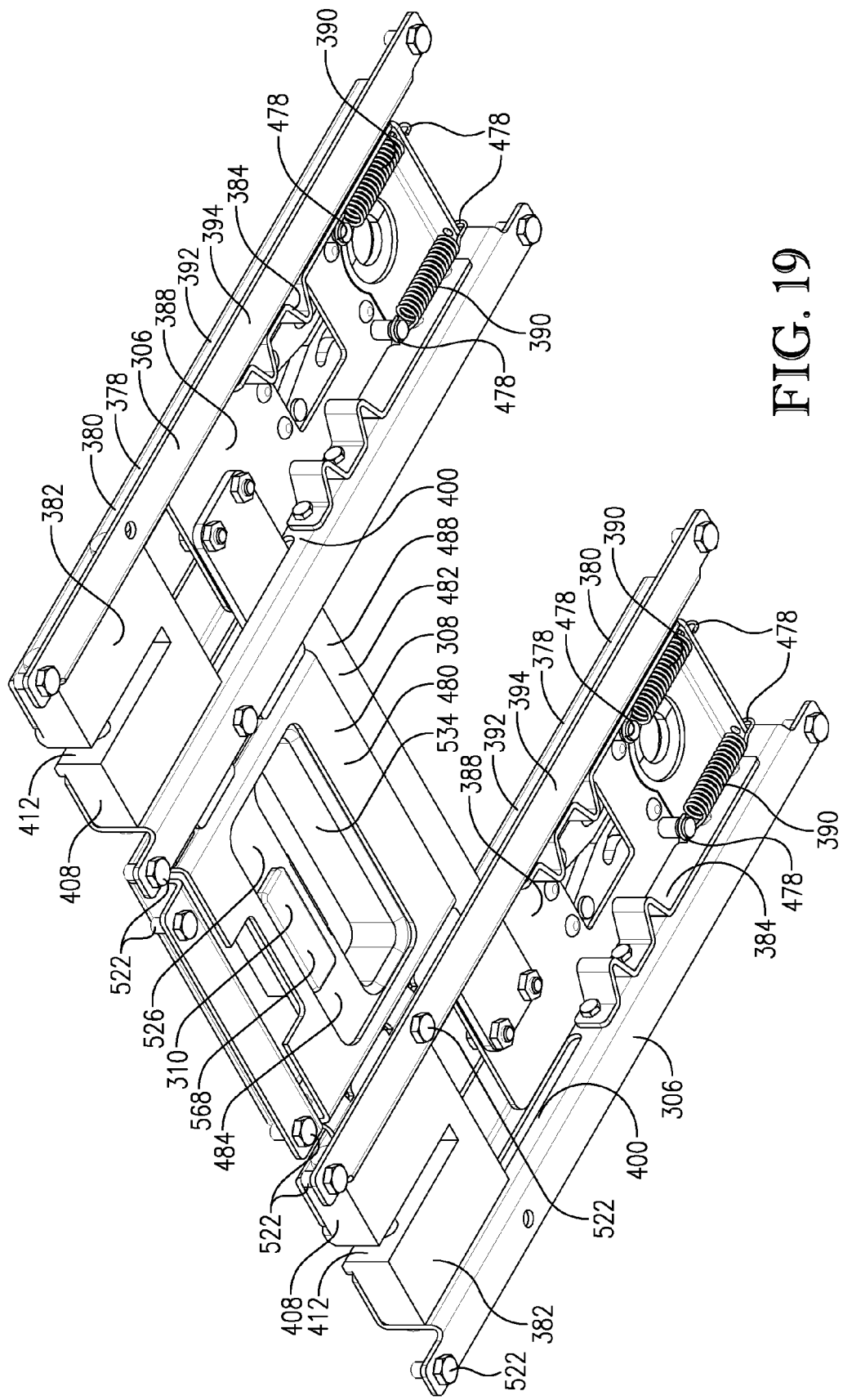
Figure 20:
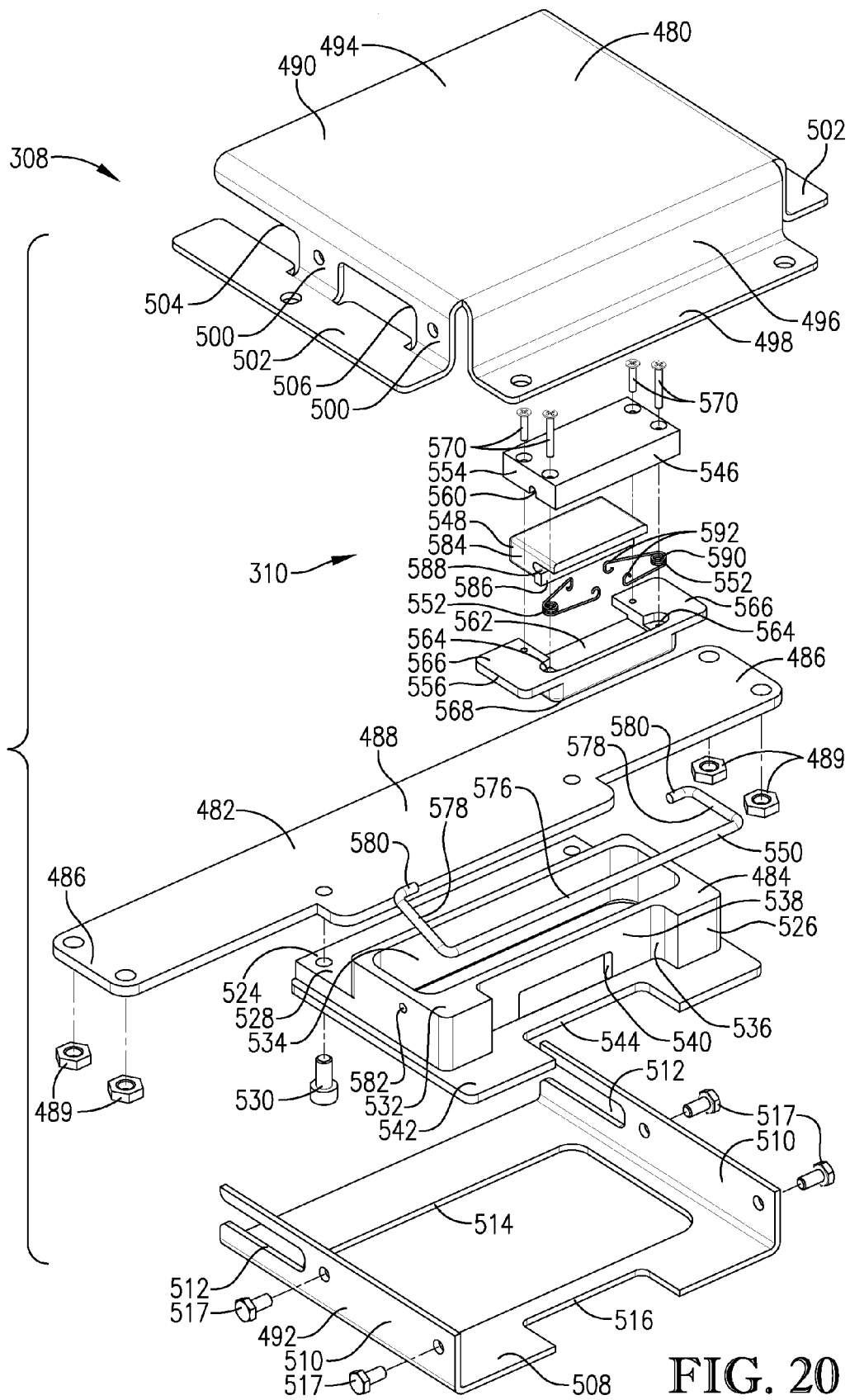
Figure 21:
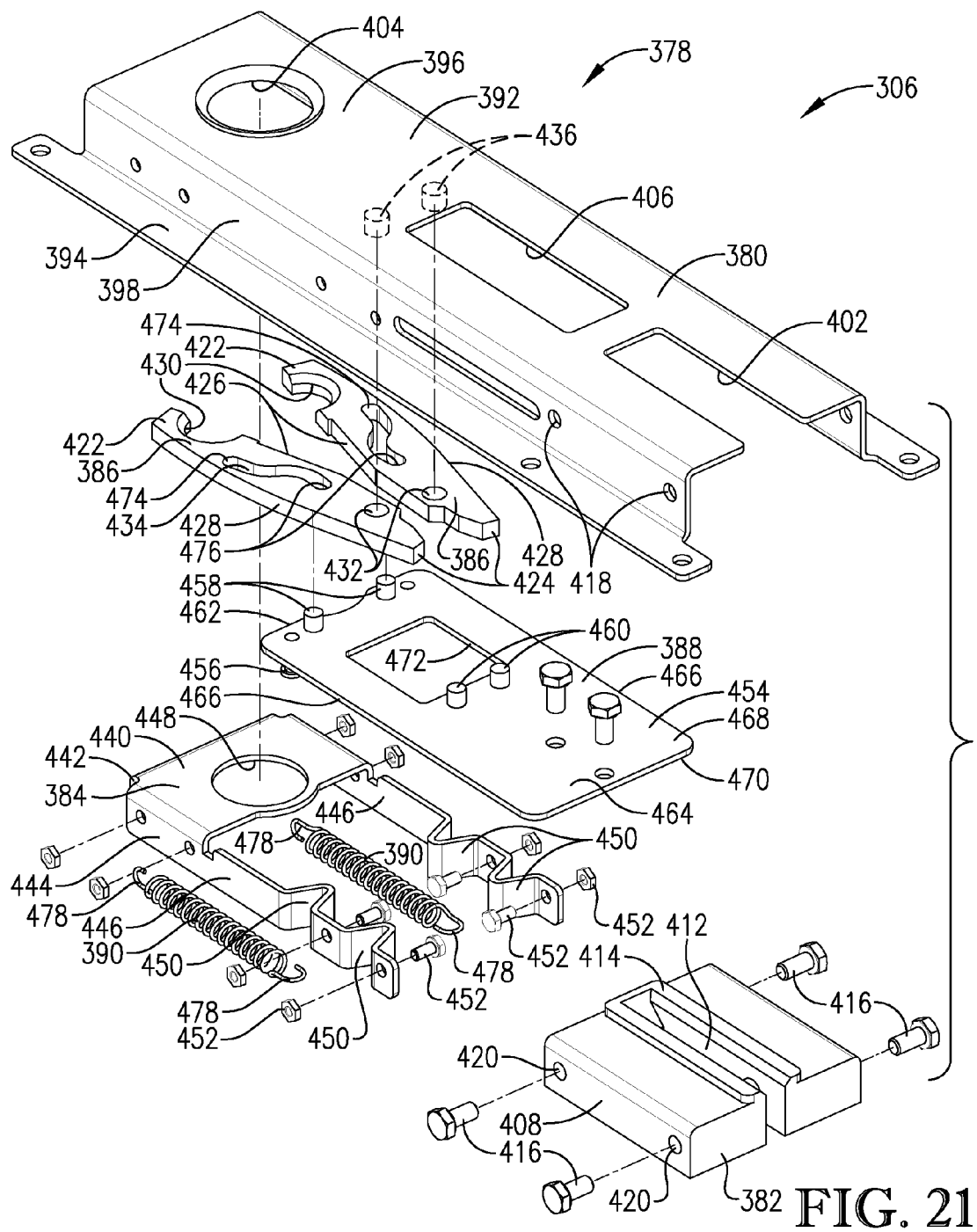
Figure 22:
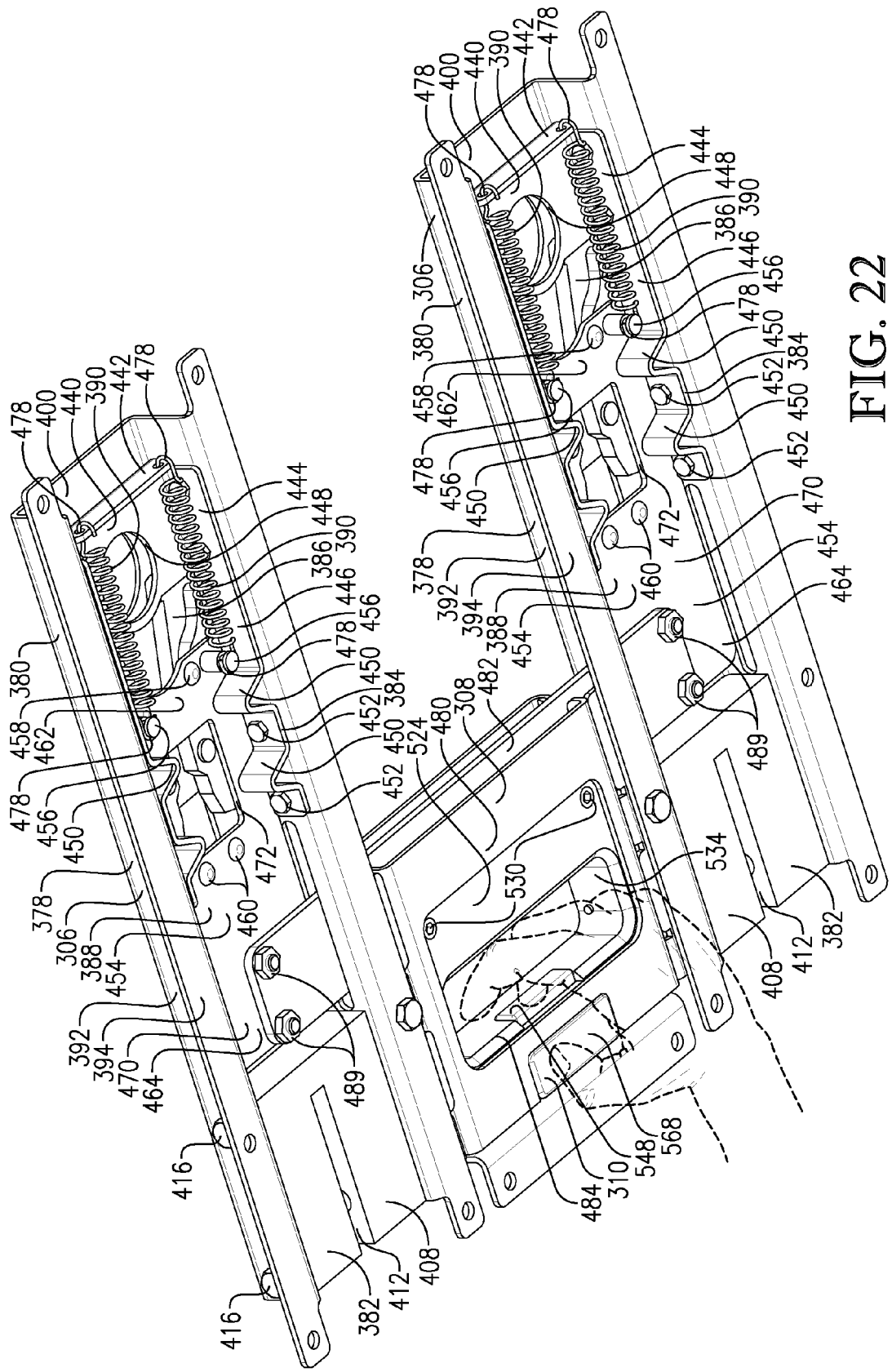
Figure 23:
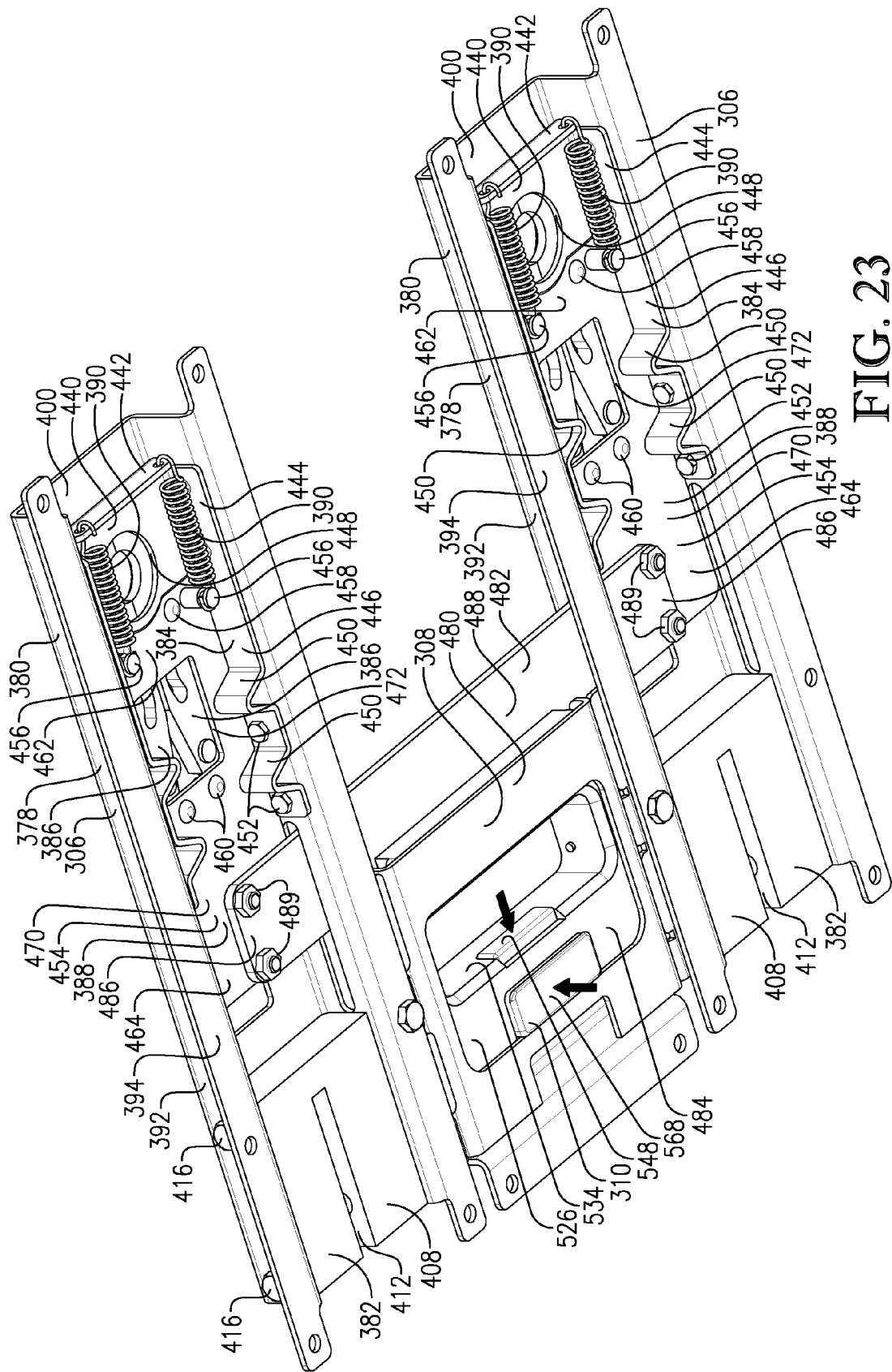
Figure 24:
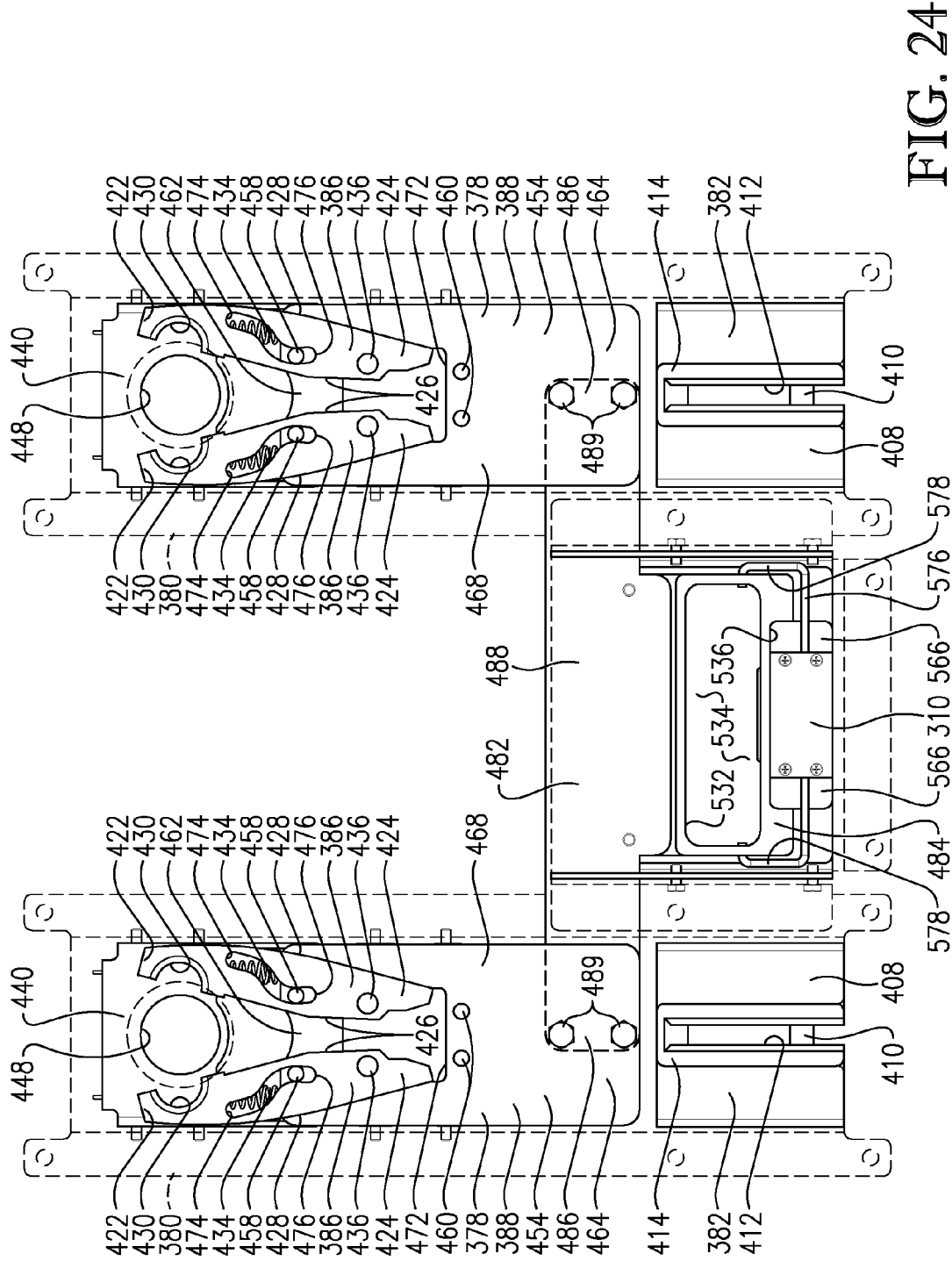
Figure 25:
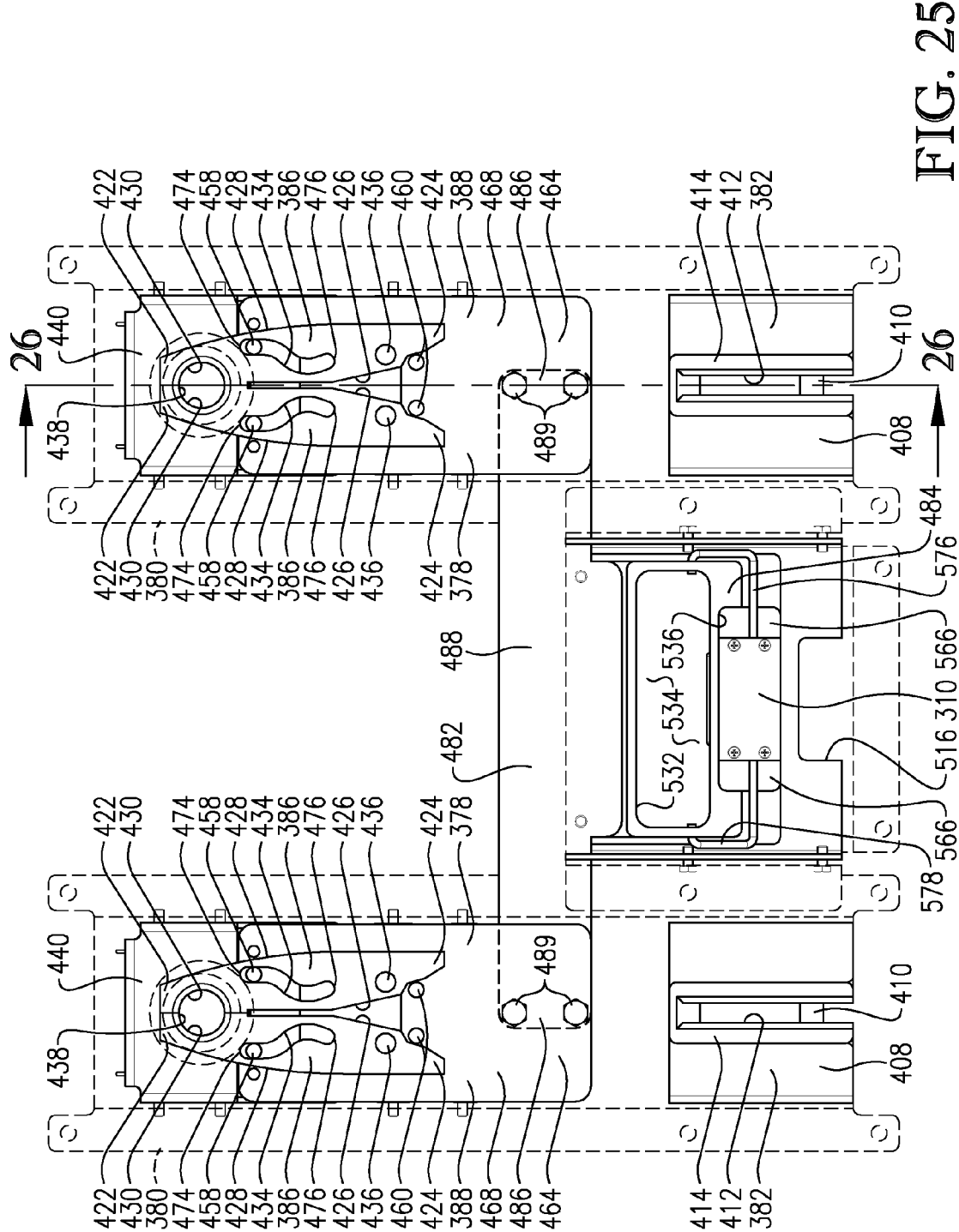
Figure 26:
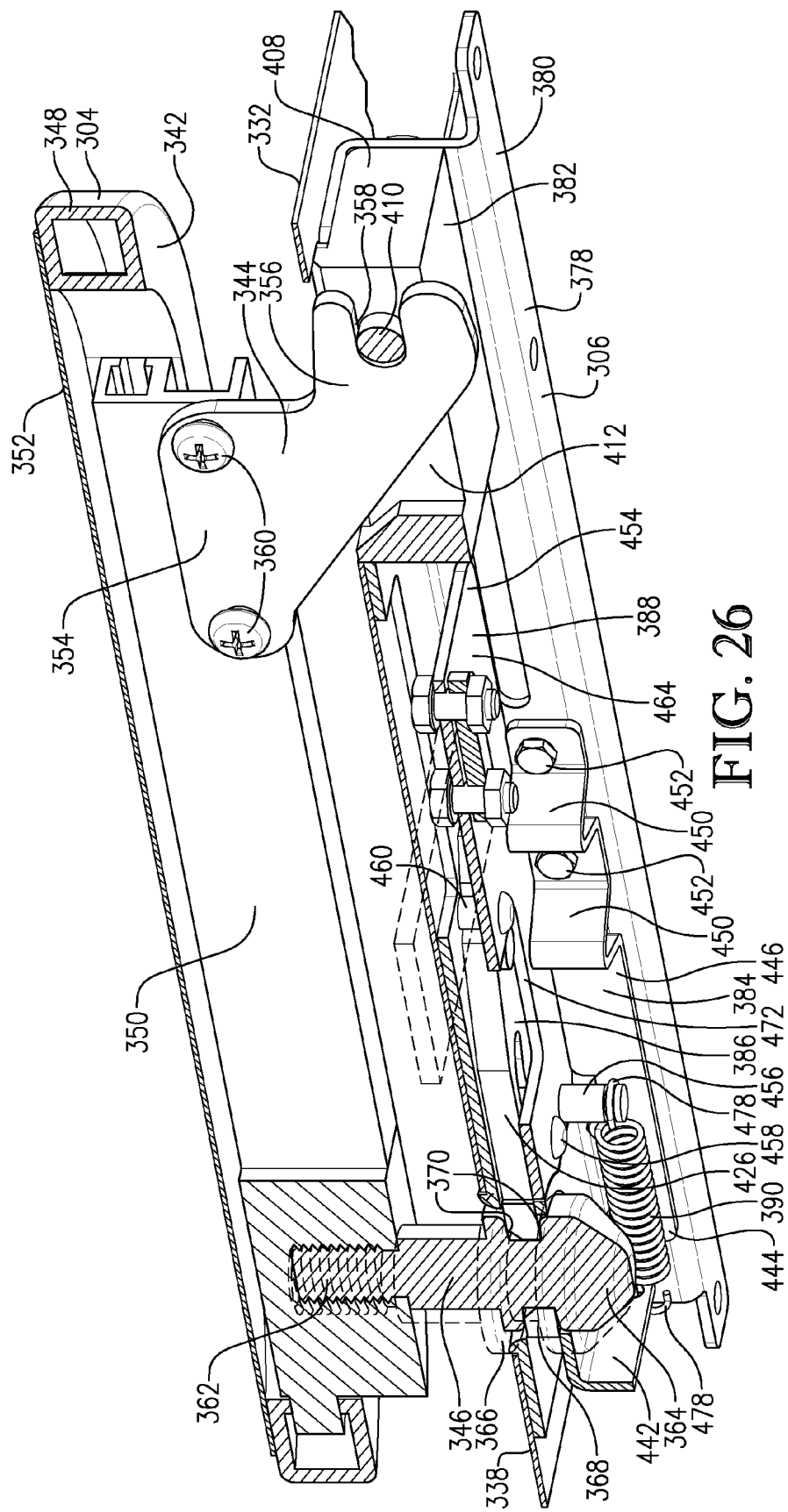
Figure 32:
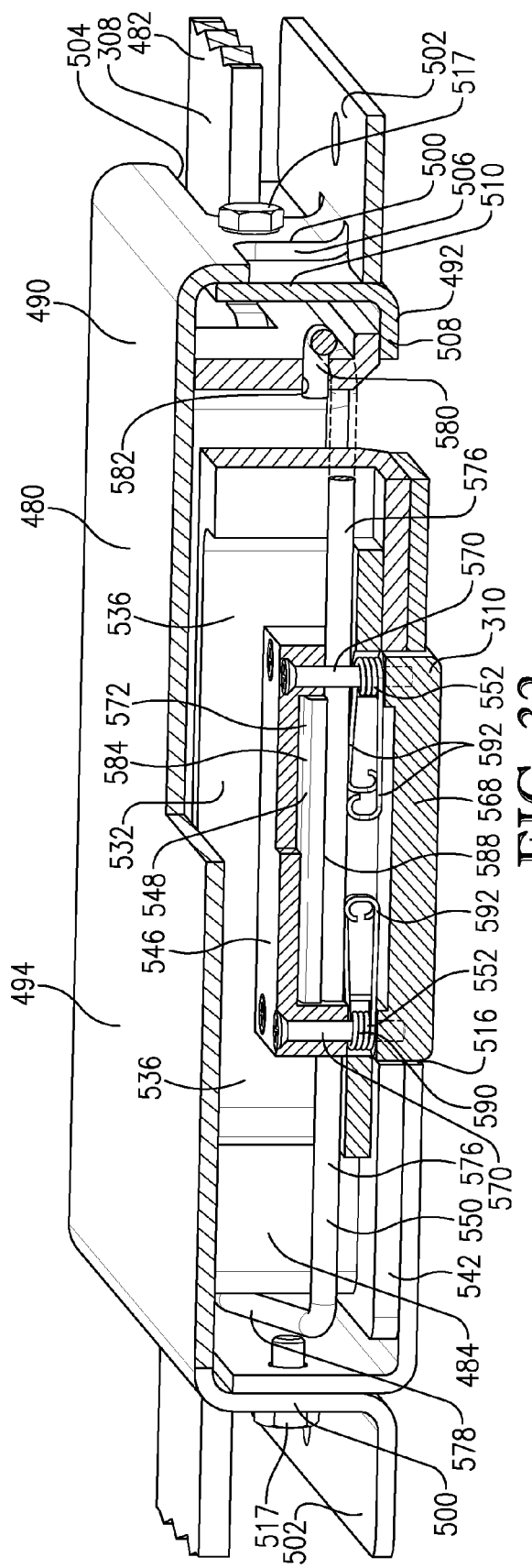

FIG. 6 is a fragmentary upper perspective view of the modular mounting system illustrated in FIGS. 1-5, showing part of the platform in phantom lines to depict the coupling, release, and locking mechanisms, with a latch assembly of the coupling mechanism being in a latched position and the release mechanism in a holding condition, and with the locking mechanism being sectioned to show a lever, protrusion, and springs of the locking mechanism;

FIG. 7 is a fragmentary upper perspective view of the modular mounting system illustrated in FIGS. 1-6, showing one of the latch assemblies, the release mechanism, and the locking mechanism exploded from one of the bottom covers;

FIG. 8 is a fragmentary upper perspective view of the modular mounting system illustrated in FIGS. 1-7, with the platform shown in phantom and showing the locking mechanism shifted out of a locked condition into an unlocked condition to permit sliding movement of the release mechanism in the indicated fore-and-aft direction;

FIG. 9 is a fragmentary upper perspective view of the modular mounting system similar to FIG. 8, but showing the release mechanism shifted into the releasing condition, with latch fingers of the latch assemblies being urged by springs into the unlatched position;

FIG. 10 is a fragmentary lower perspective view of the modular mounting system illustrated in FIGS. 1-9, showing one of the base members exploded to depict abase, hinges, and crossbars, with latch pins of the coupling mechanism being shown as exploded from one of the crossbars;

FIG. 11 is a fragmentary lower perspective view of the modular mounting system illustrated in FIGS. 1-10, showing one of the base members in an intermediate position on the platform where hinges of the base member are shiftably received in slots presented by the platform;

FIG. 12 is a fragmentary upper perspective view of the modular mounting system illustrated in FIGS. 1-11, showing one of the base members in phantom lines in a disengaged position relative to the platform, in the intermediate position on the platform, and in a supporting position on the platform where the base member rests on the upper platform surface;

FIG. 13 is a fragmentary upper perspective view of the modular mounting system illustrated in FIGS. 1-12, showing one of the base members cross sectioned to show the underlying coupling and release mechanism, and showing the base member in the supporting position where the base members rests on the platform shown in phantom lines, with the release mechanism being in the releasing condition so that the latch assembly is urged by springs into the unlatched position;

FIG. 14 is a fragmentary upper perspective view of the modular mounting system similar to FIG. 13, but with the release mechanism shifted into the holding condition and the latch assembly is in the latched position to engage the latch pins and secure the base member in the supporting position;

FIG. 15 is a fragmentary lower perspective view of the modular mounting system illustrated in FIGS. 1-14, showing the base member secured in the supporting position;

FIG. 16 is a perspective view of a modular mounting system constructed in accordance with a second embodiment of the present invention, showing a mounting base and base members attached to the mounting base, with the base members supporting a computer, a seat, and containers;

FIG. 17 is a fragmentary perspective view of the modular mounting system shown in FIG. 16, showing the mounting base exploded to depict multiple sets of coupling mechanisms, release mechanisms, and locking mechanisms mounted along a platform of the mounting base;

FIG. 18 is an upper perspective view of one set of the coupling mechanisms, release mechanisms, and locking mechanisms shown in FIG. 17, showing latch assemblies of the coupling mechanism operably connected to a corresponding release mechanism;

FIG. 19 is a lower perspective view of the set of coupling, release, and locking mechanisms shown in FIG. 18, showing a locking mechanism supported by a handle of the release mechanism, with latch fingers of the coupling mechanism in a latched position and the release mechanism in a holding condition;

FIG. 20 is an exploded view of the release mechanism and locking mechanism shown in FIGS. 18 and 19, showing a housing, a lateral connector, and the handle of the release mechanism, and also showing a lock housing, release button, lock spring, and release springs of the locking mechanism;

FIG. 21 is an exploded view of one the latch assemblies shown in FIGS. 18 and 19, showing a latch housing, block, guide, latch fingers, link plate, and latch springs of the coupling mechanism;

FIG. 22 is a lower perspective view of the set of coupling, release, and locking mechanisms shown in FIGS. 18 and 19, showing the release mechanism in a releasing condition, with the latch fingers being correspondingly shifted in an unlatched position;

FIG. 23 is a lower perspective view of the set of coupling, release, and locking mechanisms similar to FIG. 22, but showing the release mechanism shifted from the releasing condition to the holding condition, with the latch fingers being correspondingly shifted from the unlatched position to the latched position;

FIG. 24 is a fragmentary top view of the set of coupling, release, and locking mechanisms shown in FIGS. 18, 19, 22, and 23, showing the release mechanism in the releasing condition and the latch fingers in the unlatched position;

FIG. 25 is a fragmentary top view of the set of coupling release, and locking mechanisms similar to FIG. 24, but showing the release mechanism in the holding condition and the latch fingers in the latched position;

FIG. 26 is a fragmentary perspective view of the modular mounting system shown in FIGS. 16 and 17, with the modular mounting system being cross sectioned to show one of the base members secured to the mounting base, showing a latch pin mounted to the base member and secured between corresponding latch fingers in the latched position;

FIG. 27 is an upper fragmentary perspective view of the set of coupling, release, and locking mechanisms shown in FIGS. 18, 19, and 22-25, showing the release mechanism in the holding condition and the locking mechanism in a locked position;

FIG. 28 is a lower fragmentary perspective view of the set of coupling, release, and locking mechanisms shown in FIGS. 18, 19, 22-25, and 27, showing the release mechanism in the holding condition and the locking mechanism in the locked position;

FIG. 29 is an upper fragmentary perspective view of the set of coupling, release, and locking mechanisms shown in FIGS. 18, 19, 22-25, 27, and 28, showing the release mechanism in the releasing condition and the locking mechanism in the locked position;

FIG. 30 is a lower fragmentary perspective view of the set of coupling, release, and locking mechanisms shown in FIGS. 18, 19, 22-25, and 27-29, showing the release mechanism in the releasing condition and the locking mechanism in the locked position;

FIG. 31a is a fragmentary cross section of the set of coupling, release, and locking mechanisms shown in FIGS. 18, 19, 22-25, and 27-30, showing the release mechanism in the holding condition and the locking mechanism in the locked position;

FIG. 31b is a fragmentary cross section of the set of coupling, release, and locking mechanisms similar to FIG. 31a, but showing the locking mechanism in an unlocked position;

FIG. 31c is a fragmentary cross section of the set of coupling, release, and locking mechanisms similar to FIG. 31b, but showing the release mechanism in the releasing condition; and FIG. 32 is a fragmentary cross section of the set of coupling, release, and locking mechanisms shown in FIGS. 18, 19, 22-25, and 27-31c, showing the release mechanism in the releasing condition and the locking mechanism in the locked position.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

The present inventive concept is susceptible of embodiment in many forms. While the drawings illustrate, and the specification describes, certain embodiments of the invention, it is to be understood that such disclosure is by way of example only. The principles of the present inventive concept are not limited to the particular disclosed embodiments.

Figure 1:
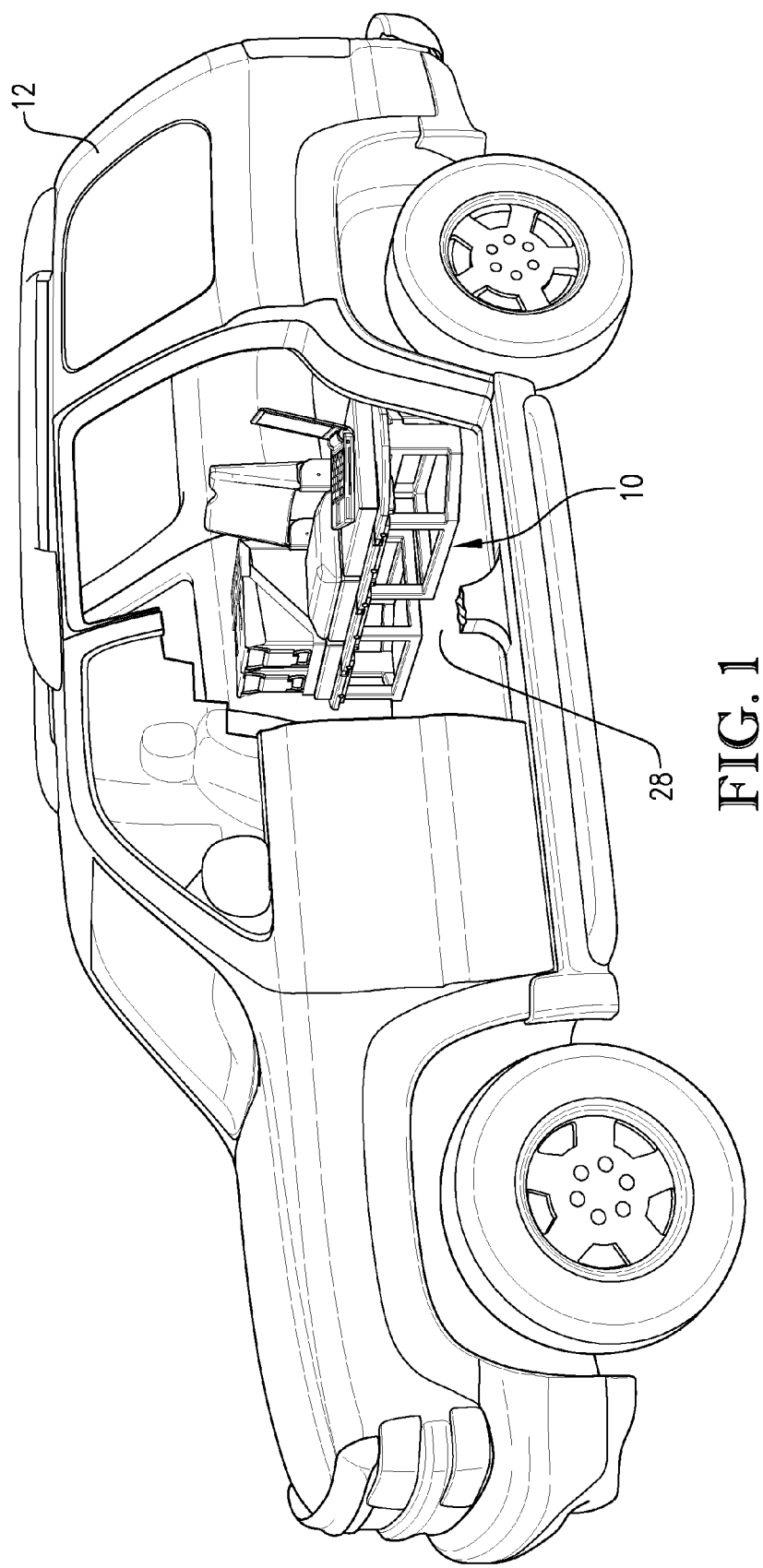
FIG. 1 is a perspective view of a modular mounting system secured in an armored vehicle in accordance with an exemplary embodiment of the present inventive concept.
Figure 2:
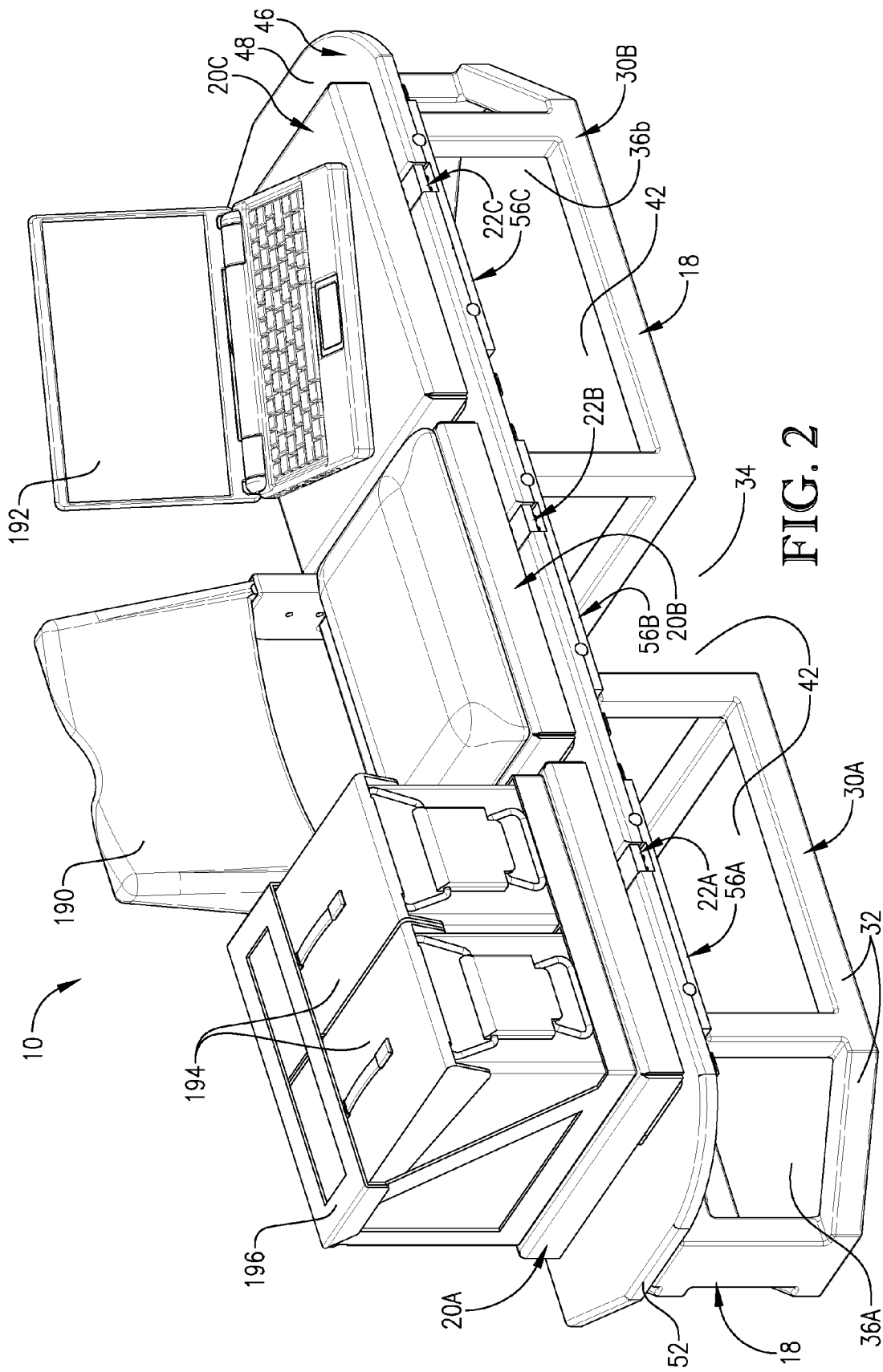
FIG. 2 is a perspective view of the modular mounting system illustrated in FIG. 1, showing a mounting base and base members attached to the mounting base, with the base members supporting a computer, a seat, and containers.

With initial reference to FIGS. 1 and 2, a modular mounting system 10 is mounted to an armored vehicle 12 in accordance with an exemplary embodiment of the present inventive concept. The illustrated vehicle 12 is preferably a self-powered automobile, but could be installed as part of a towed vehicle. Furthermore, the system 10 could be secured to other powered vehicles such as, but not limited to, a plane, boat, or another type of ground vehicle without deviating from the scope of the present inventive concept. Also, while the system 10 is preferably retrofitted onto the vehicle as part of a vehicle customization process, it is also within the ambit of the present invention where the system 10 is provided with the vehicle 12 as original equipment.

The system 10 generally includes an elongated mounting base 18 and a plurality of selectively reconfigurable shiftable base members 20A, 20B, 20C that can be shifted into and out of a supporting position (see FIG. 2). The base members 20 are each associated with a respective coupling mechanism 22A, 22B, 22C that removably holds and secures the shiftable base member 20A, 20B, 20C to the mounting base 18 in the supporting position. Preferably, the base members 20 can be secured in any of three possible mounting locations along the mounting base 18-a center location, a left-side location, and a right-side location. However, it is within the scope of the present invention where the mounting base provides either less than three or greater than three mounting locations. Also, while the exemplary embodiment of the present inventive concept illustrates the system 10 with three shiftable base members 20A, 20B, 20C, the system 10 maybe equipped with any number of shiftable base members 20A, 20B, 20C without deviating from the scope of the present inventive concept. For instance, the system 10 may be equipped with between one and six shiftable base members 20A, 20B, 20C without deviating from the scope of the present inventive concept.

The illustrated mounting base 18 is preferably rigidly coupled to an interior floor 28 of the vehicle 12 via left and right support structures 30A, 30B of the mounting base 18. The left and right support structures 30A, 30B are securely fastened to the floor 28 with fasteners (not shown) such as, but not limited to, bolts or the like. Each of the support structures 30A, 30B includes a plurality of horizontal floor-engagement bars 32 welded together to form a lowermost portion of the support structure 30. The support structures 30A, 30B are preferably spaced from each other by an intermediary region 34 and respectively define footprints 36A, 36B.

Preferably, the support structures 30A, 30B further include a plurality of vertical spacing bars 42 extending generally perpendicular to the floor-engagement bars 32 of each of the support structures 30A, 30B. Secured to an opposite end of the spacing bars 42 relative to the floor-engagement bars 32 is an elongated platform 46 of the mounting base 18. The illustrated platform 46 preferably extends in a lateral direction and is vertically spaced from the floor 28 of the vehicle 12 by the spacing bars 42. Thus, a cavity 44 is defined between the floor 28 of the vehicle 12 and the platform 46. As will be appreciated, the size of the cavity 44 is variable and determined by a length of the spacing bars 42. While the illustrated orientation and positioning of the platform 46 is preferred, it is within the scope of the present invention where the platform 46 is secured in an alternative position. For instance, the system 10 could be mounted to a generally upright wall so that the length of the platform 46 extends in a fore-and-aft direction relative to the vehicle 12 or in an upright direction.

Figure 3:
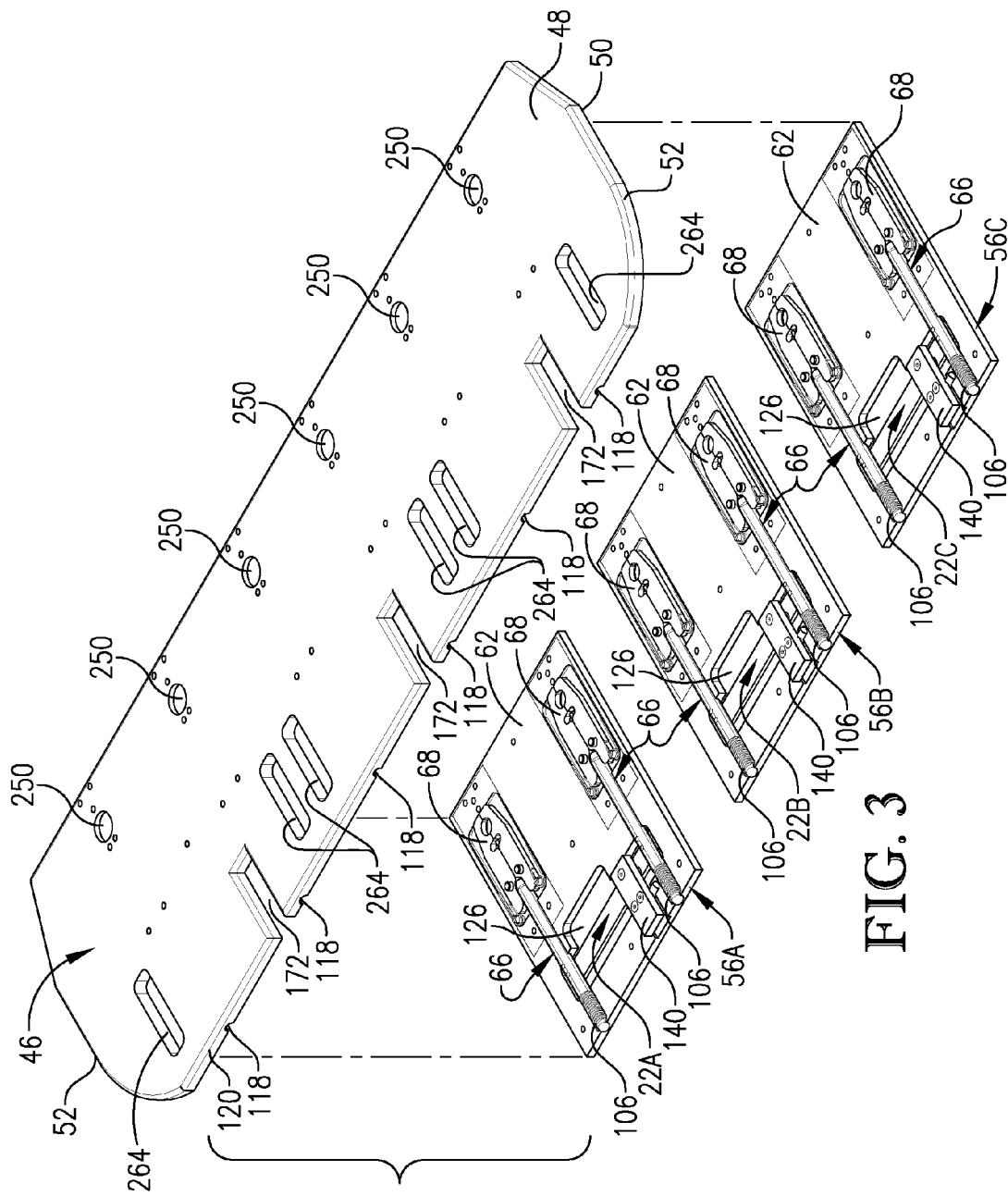
FIG. 3 is a fragmentary upper perspective view of the modular mounting system illustrated in FIGS. 1 and 2, with bottom covers, coupling mechanisms, release mechanisms, and locking mechanisms being shown as exploded from a platform of the mounting base.
Figure 4:
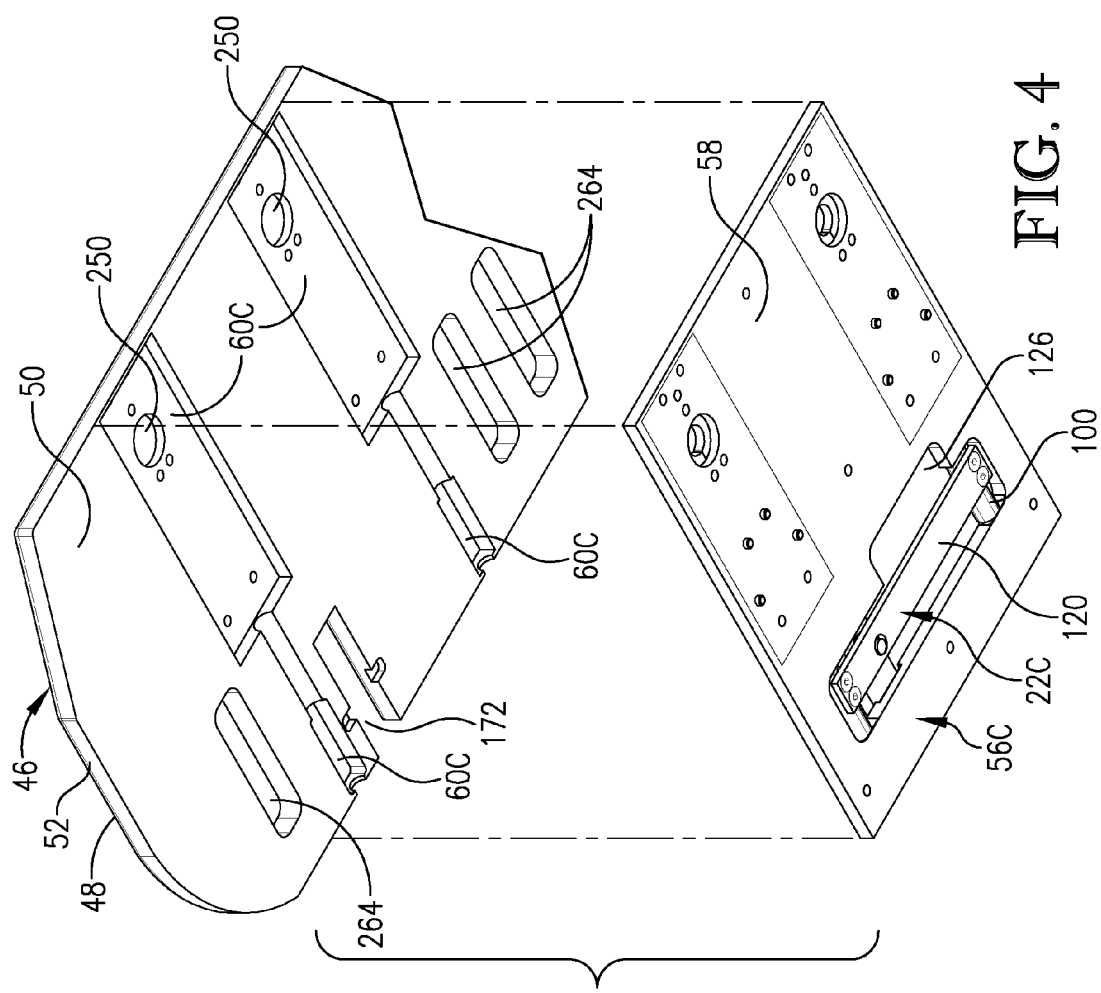
FIG. 4 is a fragmentary lower perspective view of the modular mounting system illustrated in FIGS. 1-3, showing one of the bottom covers, one of the coupling mechanisms, and one of the release mechanisms being shown as exploded from the platform to depict chambers and a lowermost surface of the platform.
Figure 5:
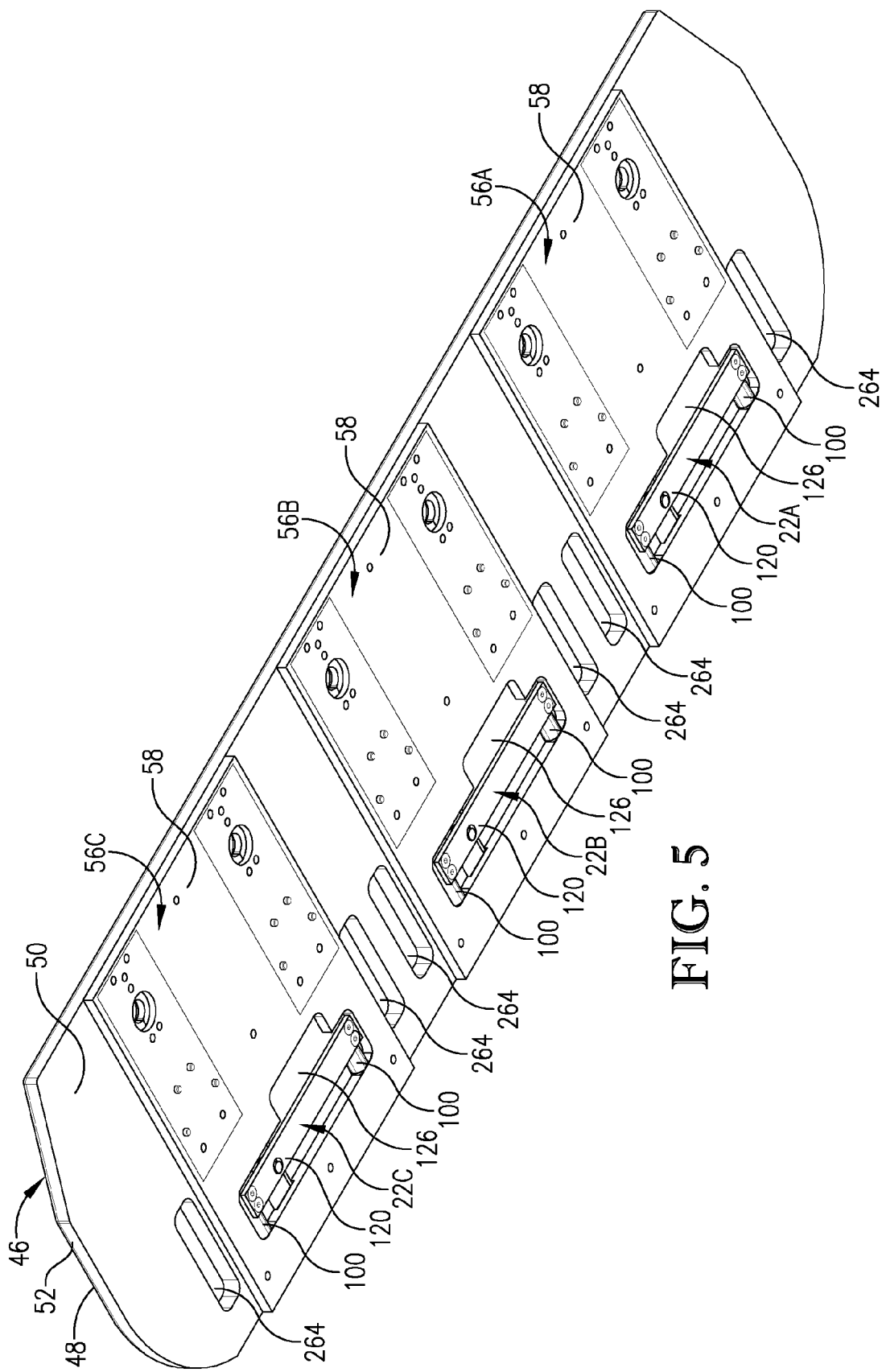
FIG. 5 is a fragmentary lower perspective view of the modular mounting system illustrated in FIGS. 1-4, with bottom covers secured to the platform.

The platform 46 presents an upwardly-facing receiving surface 48 and a downwardly-facing lowermost surface 50 that cooperatively define a common outermost margin 52 of the system 10 (see FIG. 3). The receiving surface 48 is sized and shaped to receive one or more of the plurality of shiftable-base members 20A, 20B, 20C, which will be further discussed hereafter. The lowermost surface 50 includes generally rectangular sockets 50A and grooves 50B (see FIG. 4). The downwardly-facing lowermost surface 50 is sized and shaped to receive one or more of a plurality of bottom covers 56A, 56B, 56C of the mounting base 18. Each of the bottom covers 56A, 56B, 56C presents an upper surface 57 and a lowermost surface 58. The upper surface 57 includes rectangular sockets 57A and grooves 57B (see FIGS. 7-9) that partly form the respective chambers 60. The bottom covers 56 are secured to the lowermost surface 50 with fasteners such as, but not limited to, bolts or the like. When secured to the platform 46, the bottom covers 56A, 56B, 56C cooperate with the downwardly-facing lowermost surface 50 of the platform 46 to form independent chambers 60A, 60B, 60C (see, e.g., FIG. 4). Preferably, respective pairs of sockets 50A,57A and grooves 50B,57B are aligned with one another to cooperatively form the chambers 60.

The chambers 60A, 60B, 60C are sized and shaped to respectively house, at least partially, the coupling mechanisms 22A, 22B, 22C. The illustrated latch assemblies 65 are vertically positioned entirely between the receiving surface 48 and the lowermost surface 58. The latch assemblies 65 are preferably positioned and captured within respective pairs of sockets 50A, 57A that partly define the chambers 60. It is foreseen, however, that the chambers 60A, 60B, 60C may be entirely formed in only one of the downwardly-facing lowermost surface 50 of the platform 46 or the upwardly-facing abutment surface 62 of the bottom covers 56A, 56B, 56C to substantially house the coupling mechanisms 22A, 22B, 22C without deviating from the scope of the present inventive concept.

Turning to FIGS. 6-9, each of the coupling mechanisms 22A, 22B, 22C includes a latch assembly 65 and latch pins (as will be discussed). The shiftable latch assembly 65 preferably permits selective independent coupling and decoupling of base members 20A, 20B, 20C with the mounting base 18. When coupled to the mounting base 18 at one of the three mounting locations, the base members 20 are preferably secured in the supporting position. The system 10 also has release mechanisms 66 housed respectively within chambers 60A, 60B, 60C and mounted between the mounting base 18 and bottom covers 56A, 56B, 56C. At least a portion of each release mechanism 66 is operable to be horizontally shifted with respect to the mounting base 18 and bottom covers 56A, 56B, 56C between a holding condition and a releasing condition.

The latch assemblies 65 and release mechanisms 66 are preferably spaced entirely below and substantially covered by the receiving surface 48. Also, as will be discussed in greater detail, the latch assembly 65 and release mechanism 66 are shiftable in a plane that is preferably generally parallel to a horizontal plane defined by the receiving surface 48. The coupling mechanisms 22 are preferably constructed so that the latch assemblies 65 are attached to the mounting base 18. However, for some aspects of the present invention, the latch assemblies 65 could be mounted to corresponding base members 20, with the latch pins being mounted to the mounting base 18.

Each latch assembly 65 preferably includes a pair of opposing latch fingers 70A, 70B that are both movable relative to each other and the respective bottom cover 56. However, it is within the ambit of the present invention where only one of the latch fingers 70A, 70B is movable relative to the bottom cover 56. Also, for some aspects of the present invention, the latch assembly could have a single latch finger or more than two latch fingers to secure the base member.

Each latch finger 70A, 70B is secured to one of the bottom covers 56A, 56B, 56C via a fastener 72, such as a bolt or the like, that defines an axis of rotation or pivot for the latch finger 70A, 70B secured thereto. The fasteners 72 extend into and are secured to apertures 74 (see FIG. 7) presented by corresponding bottom covers 56A, 56B, 56C. Preferably, the latch fingers 70 move in a plane that is generally parallel to the plane of the receiving surface 48.

A plurality of resilient elements or springs 76 are positioned within each of the chambers 60A, 60B, 60C, with each spring 76 positioned in engagement with a respective latch finger 70. Each spring 76 is secured to one of the bottom covers 56A, 56B, 56C via a fastener 78 such as, but not limited to, a bolt or the like. The fasteners 78 extends into and are secured to apertures 80 (see FIG. 7) presented by corresponding bottom covers 56A, 56B, 56C.

The illustrated springs 76 are preferably operable to urge the latch finger 70A, 70B to pivot about the fasteners 72 so that the latch elements 68 are generally urged away from a latched position (see FIGS. 7 and 8) and into an unlatched position (see FIG. 9). In other words, the springs 76 preferably operate so that the latch assembly 65 has a normally-open configuration. In the latched position, the latch fingers 70A, 70B are spaced from each other at proximal inner ends 82 thereof and abutted together at distal outer ends 84 thereof so that opposing half-circle pinching surfaces 86 are closed to collaboratively form a circular pin-receiving opening 88. In the unlatched position, each of the latch finger 70A, 70B are abutted together at the inner ends 82 (or at least closer together relative the latched position) and spaced from each other at the outer ends 84 so that the pinching surfaces 86 are spaced from each other and the opening 88 is expanded. Preferably, each latch assembly 65 is substantially entirely positioned in the respective chamber 60 in both the latched and unlatched positions. For some aspects of the present invention, the latch assembly 65 could be configured so that at least one spring urges the latch fingers into the latched position (i.e., where the latch assembly 65 has a normally-closed configuration) without departing from the scope of the present invention.

Additionally, when each latch assembly 65 is in the latched position, the inner ends 82 thereof define a socket 96. Each socket 96 is operable to receive a proximal inner tip 98 of an elongated release pin or shaft 100 of the release mechanism 66. Each of the chambers 60A, 60B, 60C receive shafts 100, which are horizontally shiftable within their respective chambers 60A, 60B, 60C. The illustrated shafts 100 are slidable between a holding condition (see FIG. 8) and a releasing condition (see FIG. 9).

Each release mechanism 66 includes springs 106, with each spring 106 secured around a distal outer tip 108 of the respective shaft 100. The outer tip 108 is located at a distal end of the shaft 100 opposite the inner tip 98. When each of the shafts 100 and corresponding coupling mechanisms 22A, 22B, 22C are respectively assembled within the chambers 60A, 60B, 60C, the spring 106 is abuttingly trapped between a shaft abutment surface 110 on each of the shafts 100 and a bottom plate abutment surface 112 in each of the chambers 60A, 60B, 60C (see FIG. 7). In this manner, each shaft 100 is horizontally shifted or biased away from the bottom plate abutment surfaces 112 and toward the sockets 96.

Turning to FIGS. 8 and 9, when the shafts 100 are removed from the sockets 96 (i.e., where the shafts 100 are in the releasing condition), the biasing force of the springs 76 urges the latch fingers 70A, 70B to be pivoted about the fasteners 72 so that the inner ends 82 of the latch finger 70A, 70B become abutted against each other (see FIG. 9). Furthermore, the outer ends 84 of the latch finger 70A, 70B become spaced apart along with the opposing half-circle pinching surfaces 86. As a result, the latch assembly 65 is urged by the springs 76 toward the unlatched position. Thus, the unlatched position is generally associated with the releasing condition of the release mechanism 66.

As the inner tips 98 of the shafts 100 are shifted into engagement with the sockets 96 (see FIG. 8), the inner tips 98 cause the latch fingers 70A, 70B to pivot about the fasteners 72 so that the inner ends 82 of the latch finger 70A, 70B become spaced apart from each other. Furthermore, the outer ends 84 of the latch finger 70A, 70B become abutted against each other thereby forming the circular void 88 via the opposing half-circle pinching surfaces 86 (see FIGS. 6 and 7). In other words, upon receipt of the inner tips 98 of the shafts 100 within the sockets 96, the biasing force of the springs 76 is overcome, which causes the latch fingers 70 to pivot or move from the unlatched position to the latched position. Thus, the latched position is generally associated with the holding condition of the release mechanism 66.

A lower portion 114 of an aperture 116 is formed through each of the bottom plate abutment surfaces 112 (see FIG. 7). An upper portion 118 of the aperture 116 (see FIG. 3) is formed through a side surface 119 of the platform 46. Thus, aperture portions 114,118 cooperatively form the aperture 116 when the bottom plates 56A, 56B, 56C are attached to the platform 46 (see FIG. 6). Each aperture 116 is sized and shaped to at least partially receive the outer tip 108 of the respective shaft 100 when the shafts 100 are horizontally shifted adjacent the bottom plate abutment surfaces 112 (see FIG. 9). In this manner, the apertures 116 permit a portion of the shaft 100 to project out of the platform when the shafts 100 are horizontally shifted into the releasing condition. With the shafts shifted adjacent the abutment surfaces 112, the springs 100 are compressed and the inner tips 98 are disengaged from the sockets 96 (see FIG. 9).

Connecting each pair of shafts 100 is a lateral connector or handle 120 of the release mechanism 66. The handle 120 extends between and is secured to each of the pair of shafts 100 adjacent proximal ends thereof with fasteners 124 (see FIG. 11) such as, but not limited to, bolts or the like. Each of the chambers 60A, 60B, 60C houses one of the handles 120. The handles 120 are generally positioned within and exposed by a window 126 defined by a respective bottom cover 56A, 56B, 56C (see FIG. 5). The handle 120 includes a gripping surface 128 (see FIG. 7) about a perimeter thereof that is accessible to a user of the system 10 via the window 126. The gripping surface 128 is operable to alternately abut side surfaces 134, 136 of the window 126 (see FIG. 7) when the shafts 100 are shifted to respective releasing and holding conditions. In this manner, the side surfaces 134, 136 define a fore-and-aft range of shifting movement for the release mechanisms 66.

While the system 10 preferably includes the illustrated release mechanism 66, the principles of the present invention are applicable where the release mechanism 66 has an alternative construction. For instance, the release mechanism 66 could be constructed to engage another part of the latch assembly 65 when the latch assembly is in the latched condition.

Turning to FIGS. 6-9, the system 10 also preferably includes a locking mechanism 140. The locking mechanism 140 is pivotably mounted at least partially within a recess 142 presented by a respective bottom cover 56A, 56B, 56C. Each of the locking mechanisms 140 includes a lever 143 and a lateral rocking element 144 housed in a notch support 145 formed in the bottom cover 56A, 56B, 56C. The locking mechanism 140 permits each of the locking mechanisms 140 to rock or pivot relative to its notch support 145 in the bottom cover 56A, 56B, 56C. The lever 143 of the locking mechanism 140 is secured to the rocking element 144 via fasteners 146 such as, but not limited to, bolts or the like. Extending perpendicularly from an end of each lever 143 is a protrusion 148 of the locking mechanism 140, which is secured thereto via a fastener 150 such as a bolt or the like. Each of the protrusions 148 are sized and shaped to mate with and be received by, at least partially, an aperture 152 formed at least partially through the handle 120.

Each locking mechanism 140 further includes a pair of resilient elements or springs 154 secured in the recess 142 by positioning the springs in corresponding apertures 156. Each spring 154 extends from one of the apertures 156 to abut an underside 164 of the locking mechanism 140. The springs 154 urge an exposed outer end portion 166 of the locking mechanism 140 away from the recess 142, which causes the locking mechanism 140 to pivot about the rocking element 144 (see FIG. 6). This pivoting, in turn, causes an inner end portion 168 of the locking mechanism 140, from which the protrusion 148 extends, to move in a direction toward the handle 120 and into a locked condition.

The biasing force of the springs 154 may be overcome when the user depresses an upwardly facing contact surface 170 of the locking mechanism 140 (see FIG. 8). Such movement allows the locking mechanism to be shifted by the user from the locked condition to an unlocked condition where the locking mechanism 140 permits sliding fore-and-aft movement of the release mechanism 66. The contact surface 170 is aligned with and exposed by a cutout portion 172 formed in the platform 46 to permit user access to the locking mechanism 140. It is foreseen that the contact surface 170 may be formed with a texture, such as ribbing or the like, operable to increase friction thereby facilitating a secure connection with the user and the locking mechanism 140.

Turning to FIGS. 8 and 9, with the contact surface 170 depressed, the handle 120 is operable to be shifted back and/or forth along the fore-and-aft direction. If the handle 120 is shifted so that the shafts 100 extend into the sockets 96 (so that the latch assemblies 65 are in the latched position), the aperture 152 is caused to be aligned with the protrusion 148. Upon such alignment, the protrusion 148 is operable to extend into the aperture 152 if the contact surface 16 is released. In this manner, the handle 120 is locked and unable to be shifted back and/or forth. thereby locking the handle 120. Alternatively, if the contact surface 170 is depressed and the handle 120 is shifted so that the shafts 100 are not extending into the sockets 96 (so that the latch assemblies 65 are in the unlatched position), the aperture 152 is misaligned with the protrusion 148. Thus, the protrusion 148 is unable to extend into the aperture 152, thereby permitting further movement or shifting of the handle 120 when the contact surface 170 is released by the user.

The illustrated construction of the locking mechanism 140 is preferred. However, the locking mechanism 140 could have an alternative construction (e.g., for holding the release mechanism in the locked condition) without departing from the scope of the present invention. Furthermore, for some aspects of the present invention, the system 10 could be devoid of locking mechanism 140.

Turning to FIGS. 10-15, each base member 20A, 20B, 20C includes a base 180 having a top wall 181 and a perimeter sidewall 182 that depends therefrom, as illustrated in FIGS. 12-15. Each base 180 is preferably operable to securely receive and support one or more of a variety of tools or peripherals, such as, but not limited to, a seat 190, a laptop or computer 192, containers 194 in a case 196, and/or the like. It is within the ambit of the present invention to adapt the base 180 for other attachments. Additionally, it is foreseen that the base 180 may also be used without a peripheral. For instance, the base member could be employed as a desktop or other working surface.

Each of the shiftable base members 20A, 20B, 20C also includes base member connection assemblies 202, 204. The connection assemblies 202, 204 are securely fastened to the sidewall 182 of each of the bases 180 via fasteners 220 such as, but not limited to, bolts or the like. The fasteners 220 extend through apertures 224 in each of the sidewalls 182 and into apertures 226 in the connection assemblies 202, 204.

The connection assembly 202 includes a crossbar 230. As mentioned previously, the coupling mechanisms 22 include a plurality of latch pins 232 that are attached to the crossbar 230. As will be discussed, the latch pins 232 are preferred for releasable engagement with the latch assemblies 65. However, the connection assembly 202 could have alternative structure for engaging the latch assemblies 65 without departing from the scope of the present invention. While the latch pins 232 are preferably attached to the base members 20, it is also within the scope of the present invention where the base members carry the latch assemblies 65 and the latch pins 232 are attached to the mounting base 18.

The latch pin 232 presents a threaded end 233 and a conical end 234 that flares circumferentially outward to define an outermost side perimeter 236 that terminates at an uppermost surface 238. Spaced from the uppermost surface 238 is a washer 244 integrally formed as part of the latch pin 232. Each latch pin 232 is sized and shaped to be received through an aperture 250 formed in the platform 46 of the mounting base 18 and at least partially housed in the chamber 60A, 60B, 60C. A groove 252, formed between the end 234 and washers 244, is aligned with and is operable to be engaged by the latch fingers 70 when the latch fingers 70 are in the latched position. Thus, with the fingers 70 in the latched position, the latch pin 232 is secured in and restricted from moving relative to the chamber 60A, 60B, 60C. The crossbar 230 further includes a plurality of feet 254 operable to abut the receiving surface 48 of the mounting base 18 when the base members 20A, 20B, 20C are secured to the mounting base 18. In this manner, the feet 254 further support any peripherals secured to the base members 20A, 20B, 20C.

Each connection assembly 204 includes a pair of hinges 260 on respective sides of the base 180. The hinges are operable to be received by slots 264 formed in the mounting base 18. A tab 288 of each hinge 260 engages the platform 46 so that the base members 20 can rotate about a pivot axis. Furthermore, the tabs 288 restrict removal of the base members 20A, 20B, 20C from the slots 264 when the base members 20A, 20B, 20C are also secured to the mounting base 18 by the latch assemblies 65. Another crossbar 230 is secured between the pair of hinges 260. The crossbar 230 includes a plurality of feet 254 that abut the receiving surface 48 of the mounting base 18 when the base member 20A, 20B, 20C is secured to the mounting base 18. Again, the feet serve to support the base member and any peripherals secured to the base member 20A, 20B, 20C.

To use the system 10, the base member 20 is preferably permanently installed in the vehicle 12, e.g., by attachment to the floor 28 of the vehicle 12. Depending on an intended application of the system 10, one or more base members 20A, 20B, 20C are equipped with desired peripherals. For instance, the seat 190 can be attached to allow seating of the user (e.g., while the vehicle 12 is moving and/or during use of other peripherals mounted to the system 10). Any selected peripherals are secured to the base members 20A, 20B, 20C via fasteners such as, but not limited to, bolts, an adhesive, or the like. Then, the base members 20A, 20B, 20C (and any peripherals) are ready to be mounted to the mounting base 18.

Each base member 20A, 20B, 20C is operable to be mounted to the mounting base 18 independently of the other base members 20 and in any vacant mounting location on the mounting base 18. The exemplary embodiment illustrates three possible mounting locations, that is, the center location, the left-side location, and the right-side location. Upon selection of one of the vacant locations, the hinges 260 are inserted in corresponding slots 264. The exposed locking mechanism 140 associated with a respective one of the vacant spots is depressed via the contact surface 170, which removes the protrusion 148 from the aperture 152 in the handle 120, and thereby unlocks the handle 120. This allows the release mechanism 66 to be shifted laterally from the holding condition to the releasing condition.

In one mode of latching and securing the base member 20 in the supporting position, the handle 120 is shifted toward the user by applying force to the gripping surface 128. This causes the shafts 100 to move toward the user and out of the sockets 96 so that the latch assemblies 65 open into the unlatched position. The system 10 is designed to permit simultaneous one-handed manipulation of the locking mechanism 140 and the handle 120 by the user. With the latch assembly 65 unlatched and the hinges 260 in the slots 264, the base member 20A, 20B, 20C is then pivoted about the pivot axis so that the latch pins 232 are aligned with and received by apertures 250 in the platform 46. The latch pins 232 pass through the platform 46 and into the chamber 60A, 60B, 60C so that groove 252 is aligned with fingers of latch assembly 65. The handle 120 is then released by the user and/or urged by the user to return to the holding condition, which causes the release mechanism 66 to move into the sockets 96 so that the fingers close and engage the groove 252. The locking mechanism 140 can then be released by the user so that the locking mechanism 140 engages the release mechanism 66. In this manner, each of the base members 20A, 20B, 20C are locked to the mounting base 18 independent of each other.

It is also within the ambit of the present invention where the base member is shifted into the latching position by an alternative method. For instance, the latch assembly 65 and release mechanism 66 could be configured so that the fingers of the latch assembly 65 open as the latch pins 232 are pushed downwardly into the opening 88 (i.e., so that the latch pins 232 engage and expand the fingers apart from each other).

To remove a base member 20 from the mounting base 18, the locking mechanism 140 is again disengaged from the handle 120. Then, the handle 120 and shafts 100 are shifted from the holding condition to the releasing condition. Consequently, the latch assembly 65 opens to the unlatched position so that the latch pin 232 is released. The base member 20 can then be pivoted to remove the latch pins 232 from apertures 250. Finally, the base member 20 is moved to disengage the hinges 260 from slots 264.

Accordingly, the present inventive concept provides the system 10 that is modular, is easily installed in the vehicle 12 in any one of a variety of selectable configurations, and is convertible to a variety of configurations after installation, thereby accommodating an intended use of the system 10.

Alternative Modular Mounting System

Turning to FIGS. 16-19, an alternative modular mounting system 300 is constructed in accordance with a second preferred embodiment of the present invention. For the sake of brevity, the remaining description will focus primarily on the differences of this alternative embodiment compared to the embodiment described above.

The above-referenced system 10 is described as being used in connection with a vehicle. However, it is within the ambit of the present invention where the system 10 and system 300 can be employed as part of an alternative mobile structure or as part of a stationary structure. Furthermore, the principles of the present invention are applicable where components of the illustrated systems 10,300 can be larger or smaller than described so that the system is sized to fit the intended application. For instance, the systems 10,300 could be scaled down so that the system is wearable by a user (e.g., where the system is provide as part of a wearable backpack arrangement). The alternative modular mounting system 300 preferably includes an alternative mounting base 302, alternative base members 304, alternative coupling mechanisms 306, alternative release mechanisms 308, and alternative locking mechanisms 310.

The mounting base 302 preferably includes a plurality of stanchions 312, brackets 314 that interconnect the stanchions 312, and a platform 316 (see FIG. 17). Each of the illustrated stanchions 312 includes a lateral base 318 with feet 320, an upright section 322, and a lateral support 324. Each bracket 314 includes a body 326 and opposite flanges 328 that are configured to be attached to corresponding stanchions 312. The stanchions 312 are spaced apart and secured to one another with corresponding brackets 314.

The platform 316 preferably includes a frame 330 and a cover 332. The frame 330 extends continuously about an outer margin 334 of the cover 332. The platform 316 is removably secured to the lateral supports 324 with fasteners 336 that extend through the supports 324 (see FIG. 17).

The platform 316 presents an upwardly-facing receiving surface 338 and a downwardly-facing chamber 340 (see FIG. 16). The receiving surface 338 is sized and shaped to receive one or more of the plurality of shiftable base members 304. The chamber 340 is sized and shaped to receive latch assemblies of the coupling mechanisms 306. It is within the ambit of the present invention where the platform 316 is alternatively sized and/or configured without departing from the scope of the present invention.

While the illustrated mounting base 302 is preferred, the principles of the present invention are applicable where the mounting base 302 alternatively configured. For instance, the mounting base 302 could be attached to or integrated with other structure such that the mounting base 302 does not include the stanchions 312 and brackets 314. Also, the mounting base 302 could be configured such that the mounting base 302 does not include the illustrated platform 316. Yet further, it is within the scope of the present invention where the system 300 is devoid of a mounting base. For instance, components of one or more of the coupling mechanism 306, release mechanism 308, and locking mechanism 310 could provide a suitable receiving surface.

Turning to FIGS. 16 and 26, each base member 304 preferably includes a frame 342 and hinges 344, with the frame 342 receiving latch pins 346. The illustrated frame 342 includes a tubular perimeter portion 348, cross members 350, and a top 352. Each of the hinges 344 preferably includes a plate that presents a connector end 354 and a hinge end 356 (see FIG. 26). The hinge end 356 includes a slot 358 operable to be pivotally supported by the coupling mechanisms 306. The connector end 354 is operable to be secured to the frame 342 with threaded fasteners 360.

Each of the latch pins 346 is preferably removably attached to the frame 342. The illustrated latch pin 346 presents a threaded end 362 and a conical end 364 that flares radially outwardly. The latch pin 346 includes an integral washer section 366 spaced from the conical end 364. The latch pin 346 further presents a groove 368 defined between the conical end 364 and the washer section 366, with the conical end 364 and washer section 366 presenting opposed shoulders 370 of the groove 368 (see FIG. 26). However, the latch pins 346 could be alternatively configured without departing from the scope of the present invention. Furthermore, other components of the base member 304 could be alternatively constructed.

Similar to the previously described embodiment, each base member 304 is operable to securely receive and support one or more of various tools and/or peripherals, such as a seat back 372, a computer 374, or ammunition boxes 376 (see FIG. 16). However the base member 304 could be configured to be used without supporting a tool or a peripheral (e.g., where the base member 304 is used as a seat or a desktop).

Turning to FIGS. 18, 19, and 21-23, each coupling mechanism 306 preferably includes a pair of latch assemblies 378 to selectively secure a corresponding one of the base members 304 relative to the mounting base 302. Furthermore, the coupling mechanism 306 preferably provides a tool-less mechanism to selectively secure the base members 304 to the mounting base 302. However, it is within the ambit of the present invention where only one latch assembly 378 or more than two latch assemblies 378 are used to secure the corresponding base member 304. Each latch assembly 378 preferably includes a latch housing 380, a block 382, a guide 384, latch fingers 386, link plate 388, latch springs 390, and one of the latch pins 346.

The latch housing 380 preferably comprises a unitary, stamped piece of sheet metal and includes a channel-shaped body 392 and flanges 394. The illustrated channel-shaped body 392 preferably includes a top wall 396 and opposite side walls 398 that cooperatively define an open channel 400 (see FIGS. 21 and 22). The top wall 396 presents a slot 402, a tapered pin opening 404, and a relief opening 406 spaced between the slot 402 and the tapered pin opening 404 (see FIG. 21). However, it is within the scope of the present invention where the latch housing 380 is alternatively constructed, e.g., to support other components. For instance, the latch housing 380 could be configured to support both latch assemblies 378 of the coupling mechanism 306.

Turning to FIGS. 21, and 24-26, the block 382 is preferably used to receive and support the hinge 344 of the base member 304. The block 382 also permits the base member 304 to swing relative to the latch housing 380. The block 382 preferably includes a block body 408 and a hinge pin 410 secured thereto (see FIGS. 24 and 25). The block body 408 presents a slot 412 that slidably receives the hinge 344 of the base member 304. The block body 408 also presents a projecting rim 414 that extends about the slot 412 on an upper face of the block body 408. The block 382 is secured to the latch housing 380 with fasteners 416 that extend through openings 418 in the body 392 and into threaded holes 420 in the block body 408 (see FIG. 21). The block 382 is also secured so that the rim 414 projects through and engages the slot 402, with the upper face of the block body 408 engaging the body 392.

Again, the block 382 is preferably configured so that the slot 412 slidably receives the hinge 344. The hinge end 356 is mounted on the hinge pin 410 to permit relative pivotal movement between the base member 304 and the block 382. However, this connection between the block 382 and the base member 304 could be alternatively configured without departing from the scope of the present invention.

Turning to FIGS. 21-25, the illustrated latch fingers 386 are configured to selectively secure the latch pin 346. The latch fingers 386 each preferably comprise unitary plate members. While the latch fingers 386 are preferably mirror images of one another, the following description of features applies to both latch fingers 386. The fingers 386 each have an elongated plate-like body that presents a pin-engaging end 422, a stop end 424, and inboard and outboard sides 426,428 extending between the ends 422,424 (see FIG. 21). The pin-engaging end 422 preferably includes an arcuate margin 430, where the margin 430 defines a curved edge that is preferably tapered and intersects the inboard side 426. Each latch finger 386 also preferably presents a pin opening 432 adjacent the stop end 424 and a serpentine slot 434 spaced between the ends 422,424 and between the inboard and outboard sides 426,428 (see FIG. 21).

The latch fingers 386 are pivotally mounted within the open channel 400 in sliding engagement with a lower surface of the top wall 396. In particular, the latch fingers 386 are pivotally mounted to the top wall 396 with pins 436 that are fixed to the top wall 396 and extend through corresponding pin openings 432 (see FIGS. 21, 24, and 25). The pins 436 permit the latch fingers 386 to swing along the lower surface of the top wall 396. The latch fingers 386 are preferably positioned so that the inboard sides 426 generally face one another.

The illustrated latch fingers 386 are pivotal along a plane that is parallel to the top wall 396 and to the plane of the receiving surface 338. However, the latch fingers 386 could be alternatively constructed and/or mounted to provide latching engagement relative to the receiving surface 338. The latch fingers 386 are preferably pivotal into and out of a latched position (see FIGS. 23 and 25) where the inboard sides 426 contact one another and the edges of the arcuate margins 430 cooperatively form a continuous circular opening 438 (see FIG. 25) to receive and hold the latch pin 346. The latch fingers 386 are also preferably pivotal into and out of an unlatched position (see FIGS. 22 and 24) where the inboard sides 426 are spaced from one another and the outboard sides 428 are positioned in contact with or immediately adjacent to corresponding side walls 398 of the latch housing 380. Preferably, the latch fingers 386 remain within the open channel 400 in both the latched and unlatched positions. However, the latch housing 380 and/or latch fingers 386 could be alternatively shaped and/or configured without departing from the scope of the present invention.

In the latched position, the latch fingers 386 are preferably configured to secure the latch pin 346 relative to the latch housing 380. In particular, the latch fingers 386 extend into engagement with the groove 368 in the latched position so that the margins 430 cooperatively engage the shoulders 370 and restrict movement of the latch pin 346 along the axis thereof. In the unlatched position, the latch fingers 386 permit the latch pin 346 to move axially into and out of a position directly between the margins 430 of the latch fingers 386.

Turning to FIGS. 21-23, the guide 384 preferably comprises a unitary, stamped piece of sheet metal and includes a top wall 440, an end wall 442, opposite side walls 444, and arms 446. The top wall 440 presents around opening 448 configured to permit axial movement of the latch pin 346 (see FIG. 21). The arms 446 each include a pair of projections 450 that extend in an inboard direction relative to the side walls 444. The arms 446 are integrally formed with and extend from the side walls 444.

The guide 384 is preferably removably secured to the latch housing 380 within the open channel 400. The guide 384 and latch housing 380 are secured to one another with threaded fasteners 452 that prevent relative movement between the guide 384 and latch housing 380. The guide 384 is positioned with the top wall 440 located adjacent the latch fingers 386, and the side walls 444 located adjacent to corresponding side walls 398 of the latch housing 380.

Turning to FIGS. 21-26, the link plate 388 operably interconnects the latch fingers 386 to one another. Furthermore, the link plate 388 preferably synchronizes the movement of latch fingers 386. The link plate 388 preferably includes a plate body 454, spring pins 456, guide pins 458, and stop pins 460 (see FIG. 21). The plate body 454 preferably comprises a flat and generally rectangular plate. The plate body 454 preferably presents an indexing end 462, an attachment end 464, and sides 466 that extend longitudinally between the ends 462,464 (see FIG. 21). The plate body 454 also presents upper and lower faces 468,470 and a generally square relief opening 472 spaced between the ends 462,464.

The guide pins 458 are secured to the indexing end 462 and project upwardly from the upper face 468. The stop pins 460 are secured between the ends 462,464 and adjacent the relief opening 472, with the stop pins 460 projecting upwardly from the upper face 468. The spring pins 456 are secured to the indexing end 462 and project downwardly from the lower face 470.

The illustrated link plate 388 is preferably slidably mounted within the open channel 400 and located between the latch fingers 386 and the guide 384. The link plate 388 is also positioned so that the guide pins 458 are received in corresponding serpentine slots 434 and the stop pins 460 are located between the stop ends 424 of the latch fingers 386.

The upper face 468 of the link plate 388 is preferably slidably engaged with the latch fingers 386. Also, the lower face 470 of the link plate 388 is preferably slidably engaged with and supported by the arms 446 of the guide 384 and is particularly supported by the projections 450. In this manner, the guide 384 and the latch fingers 386 cooperatively retain the link plate 388.

The link plate 388 is preferably longitudinally slidable along the latch fingers 386 into and out of a holding condition (see FIGS. 23 and 25) associated with the latched position of the latch fingers 386. In the holding condition, the guide pins 458 slide to a location adjacent a distal end 474 of the serpentine slot 434 to urge the latch fingers 386 into the latched position (see FIG. 25). At the same time, the stop pins 460 preferably slide into engagement with the stop ends 424 of the latch fingers 386 and shift the stop ends 424 into an outboard position associated with the latched position.

The link plate 388 is also preferably longitudinally slidable along the latch fingers 386 into and out of a releasing condition (see FIGS. 22 and 24) associated with the unlatched position of the latch fingers 386. In the releasing condition, the guide pins 458 slide to a location adjacent a proximal end 476 of the serpentine slot 434 to urge the latch fingers 386 into the unlatched position (see FIG. 24). At the same time, the stop pins 460 slide out of engagement with the stop ends 424 and permit the stop ends 424 to swing into an inboard position associated with the unlatched position.

While the illustrated interengagement between the link plate 388 and latch fingers 386 is preferred, it is within the ambit of the present invention where the link plate 388 and latch fingers 386 are alternatively shiftably engaged with one another. For instance, the principles of the present invention are applicable where the stop pins 460 are alternatively configured to engage the latch fingers 386. For some aspects of the present invention, the link plate 388 could be devoid of stop pins 460.

Also, the illustrated pin-and-slot arrangement between the guide pins 458 and slots 434 could be alternatively configured without departing from the scope of the present invention. For instance, the guide pins 458 and/or slots 434 could be alternatively configured or shaped. In one alternative embodiment, the latch fingers 386 could have pins that are slidably received in corresponding slots presented by the link plate 388. For some aspects of the present invention, the link plate 388 and latch fingers 386 could be devoid of the illustrated pin-and-slot arrangement.

The link plate 388 is preferably interconnected with the latch housing 380 by the latch springs 390. The latch springs 390 preferably comprise coil springs and present opposite ends 478 (see FIG. 21). In the illustrated embodiment, the latch springs 390 are preferably connected by one of the ends 478 to the end wall 442 of the guide 384 and by the opposite end 478 to the spring pins 456.

When the link plate 388 is in the holding condition (see FIG. 23), the latch springs 390 are preferably expanded from a relaxed spring condition to urge the link plate 388 toward the end wall 442 so that the link plate 388 is urged to remain in the holding condition. In other words, in the holding condition, the spring ends 478 are spaced further apart from one another compared to when the latch spring 390 is in the relaxed spring condition. In the usual manner, the spring force applied by the latch spring 390 is proportional to the spring expansion distance (the difference between the actual distance between the spring ends 478 and the distance between the spring ends 478 in the relaxed spring condition). For instance, the spring force is at a minimum value when the link plate 388 is in the holding condition. However, the latch springs 390 and link plate 388 cooperatively urge the latch fingers 386 to remain in the latched position when the link plate 388 is in the holding condition.

When the link plate 388 is in the releasing condition (see FIG. 22), the latch springs 390 are preferably expanded to a greater degree compared to the holding condition (i.e., the spring expansion distance is greater in the releasing condition than in the holding condition). Also, the spring force is preferably at a maximum value when the link plate 388 is in the releasing condition. Thus, in the releasing condition, the latch springs 390 are preferably expanded to urge the link plate 388 toward the end wall 442 so that the link plate 388 is urged toward the holding condition. Consequently, the latch springs 390 and link plate 388 cooperatively urge the latch fingers 386 out of the unlatched position and toward the latched position when the link plate 388 is in the releasing condition.

Similarly, when the link plate 388 is located between the holding and releasing conditions, the latch springs 390 are preferably expanded to a greater degree compared to the holding condition. In particular, as the link plate 388 moves away from the end wall 442, the spring expansion distance increases proportionally. When the link plate 388 is between the holding and releasing conditions, the latch springs 390 are preferably expanded to urge the link plate 388 toward the end wall 442 so that the link plate 388 is urged toward the holding condition. Thus, the latch springs 390 and link plate 388 cooperatively urge the latch fingers 386 toward the latched position when the link plate 388 is between the holding and releasing conditions. Consequently, the illustrated latch assembly 378 provides a normally-closed latch mechanism. However, for some aspects of the present invention, the latch assembly 378 could operate as a normally-open latch mechanism.

While the latch assembly 378 preferably includes the illustrated latch springs 390 and link plate 388 to shift the latch fingers 386 between holding and releasing conditions, it is within the ambit of the present invention where an alternative mechanism is used to shift and position the latch fingers 386.

Turning to FIGS. 20 and 27-32, each of the release mechanisms 308 preferably includes a housing 480, a lateral connector 482, and a handle 484. The lateral connector 482 preferably comprises an elongated unitary plate that is generally rigid and presents opposite attachment ends 486 and a central section 488 between the ends 486. The lateral connector 482 extends through slots 402 presented by the latch housings 380. The ends 486 are preferably removably attached to corresponding link plates 388 with threaded fasteners 489. As a result, corresponding pairs of the latch assemblies 378 are drivingly interconnected by the lateral connector 482. Thus, as the lateral connector 482 slides along the longitudinal direction, the corresponding link plates 388 also slide with the lateral connector 482.

Movement of the lateral connector 482 and corresponding link plates 388 causes the latch fingers 386 of the latch assemblies 378 to shift accordingly. In particular, when the lateral connector 482 and link plates 388 are shifted into the holding condition (see FIGS. 23 and 25), the latch fingers 386 of the corresponding latch assemblies 378 are shifted at substantially the same time into the latched position. Similarly, when the lateral connector 482 and link plates 388 are shifted into the releasing condition (see FIGS. 22 and 24), the latch fingers 386 of the corresponding latch assemblies 378 are shifted at substantially the same time into the unlatched position. Thus, the lateral connector 482 and link plates 388 preferably synchronize movement of the corresponding latch assemblies 378 into and out of the latched and unlatched positions.

The illustrated housing 480 includes upper and lower housing sections 490,492 (see FIG. 20). The upper and lower housing sections 490,492 each include a unitary, stamped piece of sheet metal. The upper housing section 490 includes a top wall 494, an end wall 496, an end flange 498, opposite side walls 500, and side flanges 502 (see FIG. 20). The upper housing section 490 also presents slots 504,506.

The lower housing section 492 includes a bottom wall 508 and opposite side walls 510 (see FIG. 20). The side walls 510 each present a slot 512. The bottom wall 508 presents a relatively large relief opening 514 and a relatively small relief slot 516 (see FIG. 20). The housing sections 490,492 are preferably removably attached to one another with threaded fasteners 517 that extend through holes in the respective side walls 500,510 of the housing sections 490, 492 (see FIGS. 20 and 32). The housing sections 490,492 are secured to one another so that slots 504 of the upper housing section 490 are aligned with slots 512 of the lower housing section 492. Also, the housing sections 490,492 cooperatively present an open end 518 and a closed end 520 of the housing 480 (see FIGS. 27-30).

The housing 480 is preferably secured to corresponding latch housings 380 and to the frame of the platform 316 with threaded fasteners 522 (see FIGS. 18-19). The slots 504,512 are sized and positioned to slidably receive the lateral connector 482 (see FIGS. 22 and 23). Thus, the housing 480 permits sliding movement of the lateral connector 482 between the holding condition and the releasing condition.

Referring again to FIGS. 20 and 27-32, the handle 484 provides a control for a user to shift the latch assemblies 378 from the holding condition to the releasing condition. The illustrated handle 484 is unitary and includes a connector end section 524 and a grasping section 526 (see FIG. 20). The illustrated connector end section 524 presents a ledge 528 that receives and is removably attached to the central section 488 of the lateral connector 482 with fasteners 530 (see FIG. 20).

The grasping section 526 includes a wall 532 that surrounds and defines a handle opening 534. The grasping section 536 presents a recess 536 that defines a side wall section 538 of the wall 532 (see FIGS. 20 and 31a-c). The side wall section 538 presents a slotted opening 540 that allows the handle opening 534 and recess 536 to communicate with one another (see FIGS. 20 and 31a-c). The grasping section 536 also includes a ledge 542 that extends along the recess 536 and presents a notch 544 located adjacent the slotted opening 540 (see FIG. 20).

The illustrated handle 484 is slidably mounted within the housing 480, with the connector end section 524 located adjacent the open end 518 and the notch 544 located adjacent the closed end 520. With the handle 484 shifted into the holding condition (see FIGS. 23 and 27), the notch 544 is located directly above and in communication with the relief opening 514. With the handle 484 shifted into the releasing condition (see FIGS. 22 and 29), the notch 544 is located directly above and in communication with the relief slot 516.

Again, the latch assemblies 378 preferably operate as normally-closed latch mechanisms. In order to shift the latch fingers 386 from the latched position to the unlatched position, the handle 484 is grasped (e.g., by extending one or more of a user's fingers into the handle opening 534 and holding them against the handle 484) or otherwise contacted and shifted in an unlatching direction (i.e., a direction where the handle 484 is shifted away from the latch fingers 386). Because the latch springs 390 are expanded in this direction, movement of the handle 484 in the unlatching direction occurs if a force is applied to the handle 484 that overcomes the force applied to the link plates 388 by the latch springs 390.

Similarly, where the handle 484 is out of the holding condition, movement of the handle 484 in a latching direction occurs if no force is applied to the handle 484 by the user or if any force applied to the handle 484 by the user does not overcome the force applied to the link plates 388 by the latch springs 390 (assuming the locking mechanism 310 is not restricting such movement of the handle 484).

Turning to FIGS. 20 and 27-32, the locking mechanism 310 preferably includes a lock housing 546, a release button 548, a lock spring 550, and release springs 552. The illustrated lock housing 546 includes upper and lower sections 554,556 removably attached to one another (see FIG. 20).

The upper section 554 presents an upper slot 558 (see FIGS. 27-30) and opposite grooves 560 (see FIG. 20). The lower section 556 presents a lower slot 562 and ledges 564 (see FIG. 20). The lower section 556 also presents outboard flanges 566 and a central lock button 568 that projects below the flanges 566 (see FIGS. 20 and 27-30). The lock button 568 preferably presents an elongated lip 568a (see FIGS. 27-30). When secured to one another with fasteners 570 (see FIG. 20), the upper and lower sections 554,556 cooperatively define a chamber 572 (see FIGS. 27-30) of the lock housing 546. The upper and lower sections 554,556 also cooperatively define an open end 574 (see FIGS. 29-30) that permits access to the chamber 572.

The lock spring 550 is unitary and includes a central portion 576, side portions 578 bent at about a right angle to the central portion 576, and end portions 580 bent at about a right angle to the side portions 578 (see FIGS. 20 and 32). In a relaxed condition, the illustrated side portions 578 of the lock spring 550 are preferably angularly offset relative to one another at an angle A (see FIG. 31a).

The lock spring 550 is removably mounted on the lock housing 546 by securing the central portion 576 between the upper and lower sections 554,556 and within the grooves 560. When mounted on the lock housing 546, the side portions 578 and end portions 580 are positioned adjacent to opposite sides of the lock housing 546. The end portions 580 of the lock spring 550 are removably inserted into corresponding holes 582 (see FIGS. 20 and 32) presented by the handle 484, with the lock housing 546 being shiftably positioned in the recess 536.

When the lock spring 550 interconnects the handle 484 and the lock housing 546, the lock spring 550 permits the lock housing 546 to shift relative to the handle 484 between a locked position (e.g., see FIGS. 27 and 28) and an unlocked position (e.g., see FIGS. 31b and 31c). In the locked position, the lock button 568 preferably projects below a lowermost surface of the handle 484. In the unlocked position, the lock button 568 preferably does not extend below the lowermost surface of the handle 484.

In the illustrated embodiment, the relaxed condition of the lock spring 550 is preferably associated with the lock housing 546 in the locked position (see FIGS. 27 and 28). When the lock housing 546 is in the unlocked position (see FIGS. 31b and 31c), the lock spring 550 is flexed and urges the lock housing 546 downwardly toward the locked position. In other words, the lock spring 550 biases the lock housing 546 into the locked position. Thus, the illustrated locking mechanism 310 is preferably configured so that the lock housing 546 is normally locked. However, it is within the ambit of the present invention where the locking mechanism 310 is configured so that the lock housing 546 is normally unlocked.

When the handle 484 is located in either the holding condition or the releasing condition, the lock button 568 can move between the locked position and the unlocked position. When the handle 484 is located between the holding condition and the releasing condition, the lock button 568 preferably must be located in the unlocked position (otherwise, the lower housing section 492 and the lock button 568 would be in physical interference with each other). Regardless of where the handle 484 is located, the illustrated lock spring 550 preferably urges the lock housing 546 toward the locked position.

Referring again to FIGS. 20 and 27-32, the release button 548 is preferably unitary and includes a body 584 and a retaining lip 586. The body 584 presents a groove 588 that extends along the retaining lip 586.

The release button 548 is slidably received by the chamber 572 of the lock housing 546. An upper surface of the body 584 is positioned in sliding engagement with a lower surface of the upper section 554. The release button 548 is slidable between a release position (see FIGS. 31a,b,c) and a secured position (e.g., see FIGS. 27 and 28). In the secured position, the release button 548 projects through the open end 574 of the lock housing 546. In the release position, the release button 548 preferably does not project through the open end 574 of the lock housing 546.

When the open end 574 of the lock housing 546 is aligned with the slotted opening 540 of the handle 484, the release button 548 can project through the open end 574 and the slotted opening 540 in the secured position (see FIGS. 27-30). At the same time, the retaining lip 586 of the release button 548 engages the notch 544 of the handle 484 to restrict further sliding movement out of the chamber 572 when the release button 548 is in the secured position.

The release springs 552 each include a coil 590 and ends 592 attached to the coil 590. The release springs 552 are preferably mounted on the ledges 564 and secured with corresponding fasteners 570. The ends 592 extend between the lock housing 546 and release button 548 and preferably urge the release button 548 into the secured position.

Because alignment of the open end 574 and the slotted opening 540 is preferably associated with the lock housing 546 in the locked position, the release button 548 is only locatable in the secured position when the lock housing 546 is in the locked position. The release button 548 and release springs 552 cooperatively restrict movement of the lock housing 546 out of the locked position. Thus, the release button 548 must be shifted against the force of the release springs 552 to the release position to allow the lock housing 546 to be moved out of the locked position. In this manner, the release button 548 and release springs 552 provide a safety mechanism to restrict the lock housing 546 from being inadvertently shifted out of the locked position.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A modular mounting system that permits a user to removably mount equipment, said system comprising:
   a mounting base presenting an exposed receiving surface that is generally accessible by the user;
   a removable member removably attached relative to the receiving surface in a supporting position, with the removable member being shiftable relative to the receiving surface into and out of the supporting position; and
   a latch device shiftably mounted to the mounting base to shift into latching engagement with the removable member when the removable member is in the supporting position, with the latch device restricting movement of the removable member out of the supporting position, said mounting base presenting a chamber that receives the latch device,
said mounting base including an elongated platform that presents the receiving surface, with the platform at least partly defining the chamber,
said latch device being mounted so as to move in a plane generally parallel to the receiving surface,
said latch device being spaced below the receiving surface so that the receiving surface substantially covers the latch device,
said latch device including a pair of opposed latch fingers pivotally mounted to the mounting base and pivotal in the plane into and out of latching engagement with the removable member and cooperatively capturing the removable member when in latching engagement therewith,
said latch device including a shiftable link that interconnects the fingers and is linearly slidable along the plane in a latching direction to shift the fingers toward each other and in an opposite unlatching direction to shift the fingers away from each other,
said link slidably engaging the fingers when sliding in the latching direction to urge the fingers into latching engagement with the removable member,
said link slidably engaging the fingers when sliding in the unlatching direction to urge the fingers out of latching engagement with the removable member.

2. A modular mounting system as claimed in claim 1,
said mounting base including a bottom cover that presents a downwardly facing lowermost surface,
said latch device being vertically located entirely between the receiving and lowermost surfaces.

3. A modular mounting system as claimed in claim 1,
said latch device including a spring that engages the shiftable link and urges the shiftable link to slide in the latching direction, with the link urging the fingers into latching engagement with the removable member.

4. A modular mounting system as claimed in claim 1,
said removable member including an elongated latch pin,
said fingers cooperatively presenting a pin-receiving opening, with the latch pin extending through the pin-receiving opening when in latching engagement with the fingers.

5. A modular mounting system as claimed in claim 4,
said latch pin being elongated and presenting a latch pin axis aligned with the pin-receiving opening,
said removable member being shiftable along the latch pin axis to shift into and out of latching engagement with the fingers.

6. A modular mounting system as claimed in claim 1,
said shiftable link being shiftably positioned within the chamber,
said latch device including a spring that engages the shiftable link and urges the shiftable link to slide in the latching direction, with the link urging the fingers into latching engagement with the removable member.

7. A modular mounting system as claimed in claim 1,
said receiving surface defining a surface opening,
said removable member including a latch element that projects through the surface opening to extend to the latch device so that the latch device is in latching engagement with the latch element.

8. A modular mounting system as claimed in claim 7,
said latch element comprising an elongated latch pin,
said fingers cooperatively presenting a pin-receiving opening,
said openings being substantially axially aligned with one another, with the latch pin extending through the openings when in latching engagement with the fingers.

9. A modular mounting system as claimed in claim 1; and
a release mechanism operable to permit decoupling of the removable member from the mounting base.

10. A modular mounting system as claimed in claim 9,
said release mechanism including a handle slidably mounted relative to the latch finger and configured to be grasped by a user to transition said release mechanism between the holding and releasing conditions.

11. A modular mounting system as claimed in claim 9; and
a locking mechanism mounted to the mounting base and shiftable into and out of a locked condition where the locking mechanism restricts movement of the release mechanism out of the holding condition.

12. A modular mounting system as claimed in claim 11,
said locking mechanism including a button configured to be depressed by a user,
said release mechanism including a handle configured to be grasped by a user to transition said release mechanism between the holding and releasing conditions, with the lever and handle being interengaged in the locked condition.

13. A modular mounting system as claimed in claim 1, one of said fingers presenting a slot that extends along the plane,
said shiftable link including a guide element inserted in the slot and slidably engaged with the slot, with the guide element sliding along the length of the slot to urge the fingers to move relative to one another when the link slides in the latching direction and the unlatching direction.

14. A modular mounting system as claimed in claim 13,
at least part of said slot extending at an oblique angle relative to the latching and unlatching directions.

15. A modular mounting system as claimed in claim 13,
each of said fingers presenting a slot that extends along the plane,
said shiftable link including a pair of guide elements,
each of said guide elements being inserted in and slidably engaged with a corresponding one of the slots, with the guide elements sliding along the length of the slots to urge the fingers to move relative to one another when the link slides in the latching direction and the unlatching direction.

* * * * *